(12) United States Patent
Stein et al.

(10) Patent No.: US 9,256,791 B2
(45) Date of Patent: Feb. 9, 2016

(54) ROAD VERTICAL CONTOUR DETECTION

(71) Applicant: Mobileye Vision Technologies Ltd., Jerusalem (IL)

(72) Inventors: Gideon Stein, Jerusalem, IL (US); Amnon Shashua, Mevasseret Zion (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 14/554,500

(22) Filed: Nov. 26, 2014

(65) Prior Publication Data

US 2015/0086080 A1      Mar. 26, 2015

Related U.S. Application Data

(63) Continuation-in-part of application No. 13/693,713, filed on Dec. 4, 2012, now Pat. No. 9,118,816.

(60) Provisional application No. 61/908,848, filed on Nov. 26, 2013.

(51) Int. Cl.
| | |
|---|---|
| *H04N 7/18* | (2006.01) |
| *G06K 9/00* | (2006.01) |
| *G06T 7/00* | (2006.01) |

(52) U.S. Cl.
CPC ........ *G06K 9/00798* (2013.01); *G06T 7/0032* (2013.01); *H04N 7/183* (2013.01); *G06T 2207/10004* (2013.01); *G06T 2207/30256* (2013.01)

(58) Field of Classification Search
CPC .. G06K 9/00798; H04N 7/183; G06T 7/0032; G06T 2207/30256; G06T 2207/10004

USPC ......... 348/148, 143, 147, 149, 153, 154, 159; 386/226, 248
See application file for complete search history.

(56) References Cited

U.S. PATENT DOCUMENTS

| | | |
|---|---|---|
| 7,411,486 B2 | 8/2008 | Gern et al. |
| 2011/0063097 A1 | 3/2011 | Naka et al. |

(Continued)

FOREIGN PATENT DOCUMENTS

| | | | |
|---|---|---|---|
| WO | WO 2005/025917 | * | 7/2004 |

OTHER PUBLICATIONS

"High Accuracy Optical Flow Estimation Based on a Theory for Warping", Thomas Brox et al., In Proc. 8th European Conference on Computer Vision, Springer LNCS 3024, T. Pajdla and J. Matas (Eds.), vol. 4, pp. 25-36 Prague, Czech Republic, May 2004 c Springer-Verlag Berlin Heidelberg 2004.

(Continued)

*Primary Examiner* — Robert Chevalier
(74) *Attorney, Agent, or Firm* — The Law Office of Michael E. Kondoudis

(57) ABSTRACT

A driver assistance/control system includes a camera operatively connectable to a processor mountable in a host vehicle. A vertical deviation in road contour is detected while the host vehicle is moving. First, second and third images of the road are captured from the camera. By matching image points of the road in the first image and corresponding image points of the road in the second image, a first homography is computed which transforms the first image of the road to the second image of the road. A second homography is computed which transforms the second image of the road to the third image of the road. A chained homography is computed by chaining the first and second homographies. By using the chained homography as an initial guess, a third homography is computed which transforms the first image of the road to the third image of the road.

19 Claims, 17 Drawing Sheets

(56) References Cited

U.S. PATENT DOCUMENTS

2011/0262009 A1 10/2011 Duan et al.
2012/0140988 A1 6/2012 Takahashi

OTHER PUBLICATIONS

C. Liu. "Beyond pixels: exploring new representations and applications for motion analysis". Doctoral Thesis. Massachusetts Institute of Technology. May 2009. Appendix A pp. 143-148).
"Determining Optical Flow", Berthold K.P., Artificial Intelligence 17 (1981) pp. 185-203.
Lourakis, Manolis IA, and Antonis A. Argyros. "Chaining planar homographies for fast and reliable 3d plane tracking." Pattern Recognition, 2006. ICPR 2006. 18th International Conference on. vol. 1. IEEE, 2006.
Extended European Search Report, App. No. 12195922.5, Nov. 21, 2014.
Braillon, Christophe, et al. "Real-time moving obstacle detection using optical flow models." Intelligent Vehicles Symposium, 2006 IEEE. IEEE, 2006.
Rabe, Clemens, Christoph Volmer, and Uwe Franke. "Kalman Filter based Detection of Obstacles and Lane Boundary in Monocular Image Sequences." Autonome Mobile Systeme 2005. Springer Berlin Heidelberg, 2006. 51-57.

* cited by examiner

15w

15d

ROAD VERTICAL CONTOUR DETECTION

CROSS REFERENCE TO RELATED APPLICATIONS

The present application is a continuation-in-part of U.S. patent application Ser. No. 13/693,713 filed Dec. 4, 2012, and additionally claims priority from U.S. provisional patent application 61/908,848 filed Nov. 26, 2013 the disclosures of which are included herein by reference.

BACKGROUND

1. Technical Field

The present invention relates to a system that accurately detects the shape and particularly the vertical contour of a road using a camera.

2. Description of Related Art

During the last few years camera based driver assistance systems (DAS) have been entering the market; including lane departure warning (LDW), automatic high-beam control (AHC), traffic sign recognition (TSR) forward collision warning (FCW) and pedestrian detection.

Active suspension and adaptive suspension/semi-active suspension are types of automotive suspensions that controls the vertical movement of the wheels relative to the chassis or vehicle body with an onboard system, rather than in passive suspensions where the movement is being determined entirely by the road surface. Active suspensions can be generally divided into two main classes: pure active suspensions and adaptive/semi-active suspensions. While adaptive suspensions only vary shock absorber firmness to match changing road or dynamic conditions, active suspensions uses some type of actuator to literally raise and lower the chassis independently at each wheel.

The term "homography" as used herein refers to an invertible transformation from a projective space to itself that maps straight lines to straight lines. In the field of computer vision, two images of the same planar surface in space are related by a homography assuming a pinhole camera model.

BRIEF SUMMARY

Various driver assistance and/or control systems mountable in a host vehicle and computerized methods for driver assistance and/or control are provided for herein. The driver assistance/control system includes a camera operatively connectable to a processor mountable in a host vehicle. The computerized methods/systems detect a vertical deviation in contour of a road while the host vehicle is moving. A first image of the road is captured from the camera at a first time, a second image of the road is captured at a second time later than the first time, and a third image of the road is captured at a third time later than the second time. By matching image points of the road in the first image and corresponding image points of the road in the second image, a first homography is computed which transforms the first image of the road to the second image of the road. By matching image points of the road in the second image and corresponding image points of the road in the third image, a second homography is computed which transforms the second image of the road to the third image of the road. A chained homography is computed by chaining the first and second homographies. By using the chained homography as an initial guess, a third homography is computed which transforms the first image of the road to the third image of the road. The first and second homographies may be represented by respective matrices and the chained homography may be computed by multiplying the matrices.

In the first image a location on the road is located corresponding to a given distance on front of the vehicle. The vehicle path in the images may be estimated from one or more of the homographies. Image motion may be processed between the first image, the second image and the third image of the road. The processing of the image motion between the images of the road includes computes the vertical deviation of the contour of the road using a road surface model of the road. The computation of the vertical deviation in the contour from the road surface model includes estimating optical flow between the first, second and/or third images by comparing the optical flow with an optical flow as predicted by the road surface model and producing thereby a residual optical flow indicating the vertical deviation.

A third image frame may be captured in the field of view of the camera and image motion between respective images of the road may be derived from the third image frame and one or more of the first and second image frames. A multi-frame road surface model may be computed by combining a road profile of the road derived from said road surface model based on said first image frame and said second image frame with said second processing.

The multi-frame road surface model may be mapped from the first and/or second image frames to the third image frame by using a homography between said at least one previous image frame to the third image frame.

Assuming a planar model for the contour of the road, the image motion of the images of the road may be processed by initially warping the second image frame toward the first image frame to produce a warped second image frame. The initial warp may include aligning the second image frame with the first image frame by adjusting for an image shift due to motion of the vehicle relative to the road, yaw, pitch and/or roll. The initial warp may include an adjustment for the relative scale change between the second image frame and the first image frame. The relative scale change arises from different distances to the camera.

Multiple image points may be selected in the first image frame. The image points may be located on the image of the road surface and may be located at points of a fixed grid. For the image points, multiple image patches are located disposed respectively about the image points. The image points may be tracked by correlating the image patches in the first image frame with corresponding image patches in the warped second image frame to produce multiple tracked points. The tracked points are fit to a homography. A refined warp of the warped second image frame toward the first image frame may be performed to correct the initial warp by using the homography and to produce a refinely warped second image frame. Optical flow may be computed between the refinely warped second image frame and the first image frame. The optical flow is compared with a road surface optical flow based on a road surface model. The deviation in vertical contour of the road produces a residual optical flow different from the road surface optical flow as found by the road surface model.

Various computerized methods and/or system are provided for detecting a deviation in vertical contour of a road. The methods are performable by driver assistance/control systems mountable in a host vehicle while the host vehicle is moving. The driver assistance system includes a camera operatively connectable to a processor. A first image of the road is captured from the camera at a first time and a second image of the road is captured at a second time. By matching image points of the road in the first image and corresponding image points of the road in the second image, a homography is computed which transforms the first image of the road to the second image of the road. The homography is used to align and warp the first image toward the second image to produce thereby a warped first image. The optical flow is compute between the second image and the warped first image. The optical flow is compared with a road surface optical flow based on a road surface model to produce thereby a residual optical flow different from the road surface model. The residual optical flow may be used to generate a vertical deviation in contour of the road which may be used as an input to an active/semi-active/adaptive suspension control system of the vehicle. The residual optical flow may be used to generate a vertical deviation in contour of the road to detect a hazard of height above the road of ten centimeters at a distance of more than thirty meters.

Various methods and systems are provided for herein for determining the vertical deviation of the road along a path where a wheel of the vehicle is predicted to travel based on the image motion between images captured from a single camera. The vertical deviation of the road may be used for active or semi-active suspension control. A first image may be warped towards a second image according to a road model homography and the residual motion is used for determining the vertical deviation.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
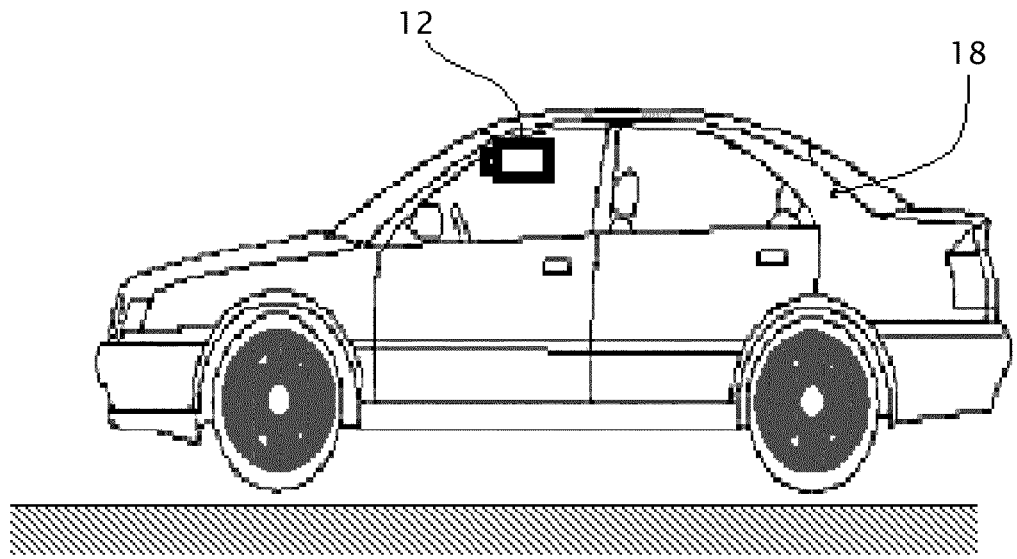
FIGS. 1 and 2 illustrate a system including a camera or image sensor mounted in a vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

Figure 2:
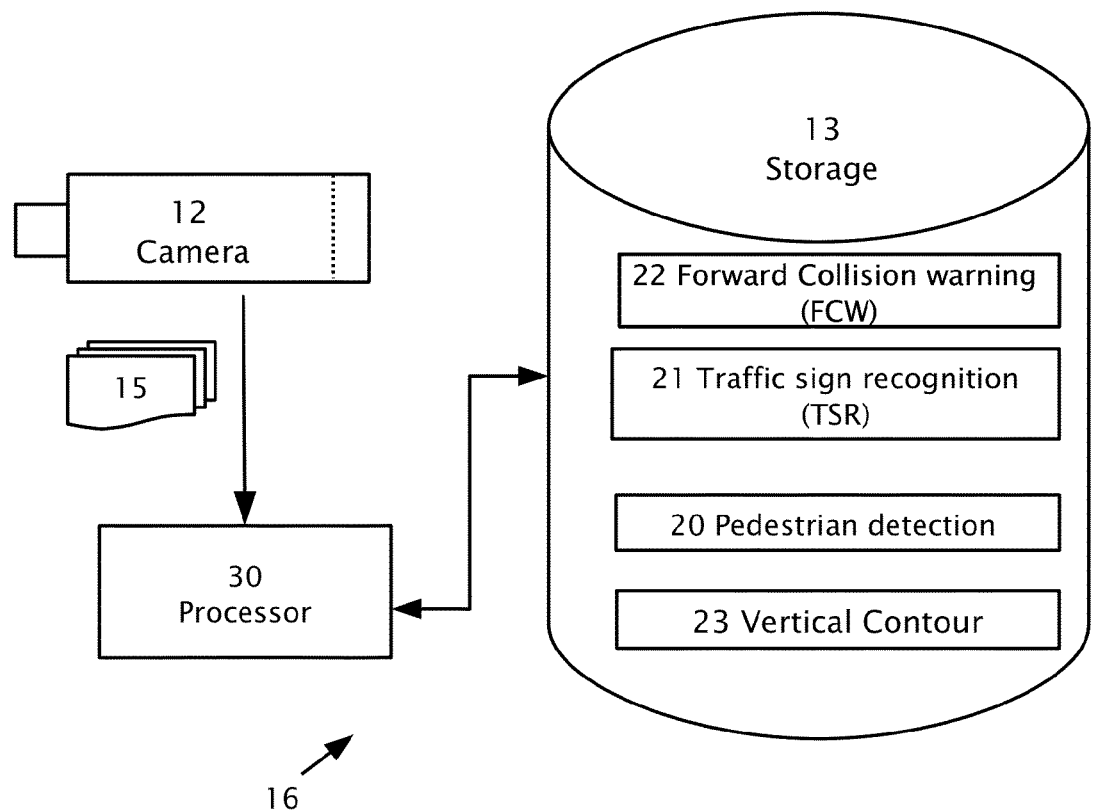

Reference is now made to FIGS. 1 and 2 which illustrate a system 16 including a camera or image sensor 12 mounted in a vehicle 18, according to an aspect of the present invention. Image sensor 12, imaging a field of view in the forward direction provides image frames 15 in real time and image frames 15 are captured by an image processor 30. Processor 30 may be used to process image frames 15 simultaneously and/or in parallel to serve a number of driver assistance systems/applications. Processor 30 may be used to process image frames 15 to detect and recognize an image or portions of the image in the forward field of view of camera 12. The driver assistance systems may be implemented using specific hardware circuitry (not shown) with on board software and/or software control algorithms in storage 13. Image sensor 12 may be monochrome or black-white, i.e. without color separation or image sensor 12 may be color sensitive. By way of example in FIG. 2, image frames 15 are used to serve pedestrian detection 20, traffic sign recognition (TSR) 21, forward collision warning (FCW) 22 and real time detection 23 of the vertical contour of the road or deviation from the road plane according to features of the present invention.

In some cases, image frames 15 are partitioned between different driver assistance applications and in other cases the image frames 15 may be shared between the different driver assistance applications.

By way of introduction, various embodiments of the present invention are useful to accurately detect road shape i.e. vertical profile from a road using camera 12 mounted in host vehicle 18. Using systems and methods provided herein, bumps and/or holes such as speed bumps, curbs and manhole covers may be detected with vertical deviations as little as two centimeters from the road plane. System and methods as disclosed herein may be similarly applied to forward viewing, side viewing and rear viewing cameras 12.

Various methods as described herein accurately estimate the planar (or bi-quadratic) model of the road surface and then computes the small deviations from the planar (or bi-quadratic) road surface model to detect bumps and holes. The term "road surface model" as used herein refers to a planar or bi-quadratic model of the road surface. The term "vertical contour" as used herein refers to the deviations from the road surface model which are perpendicular to the road surface.

Figure 3:
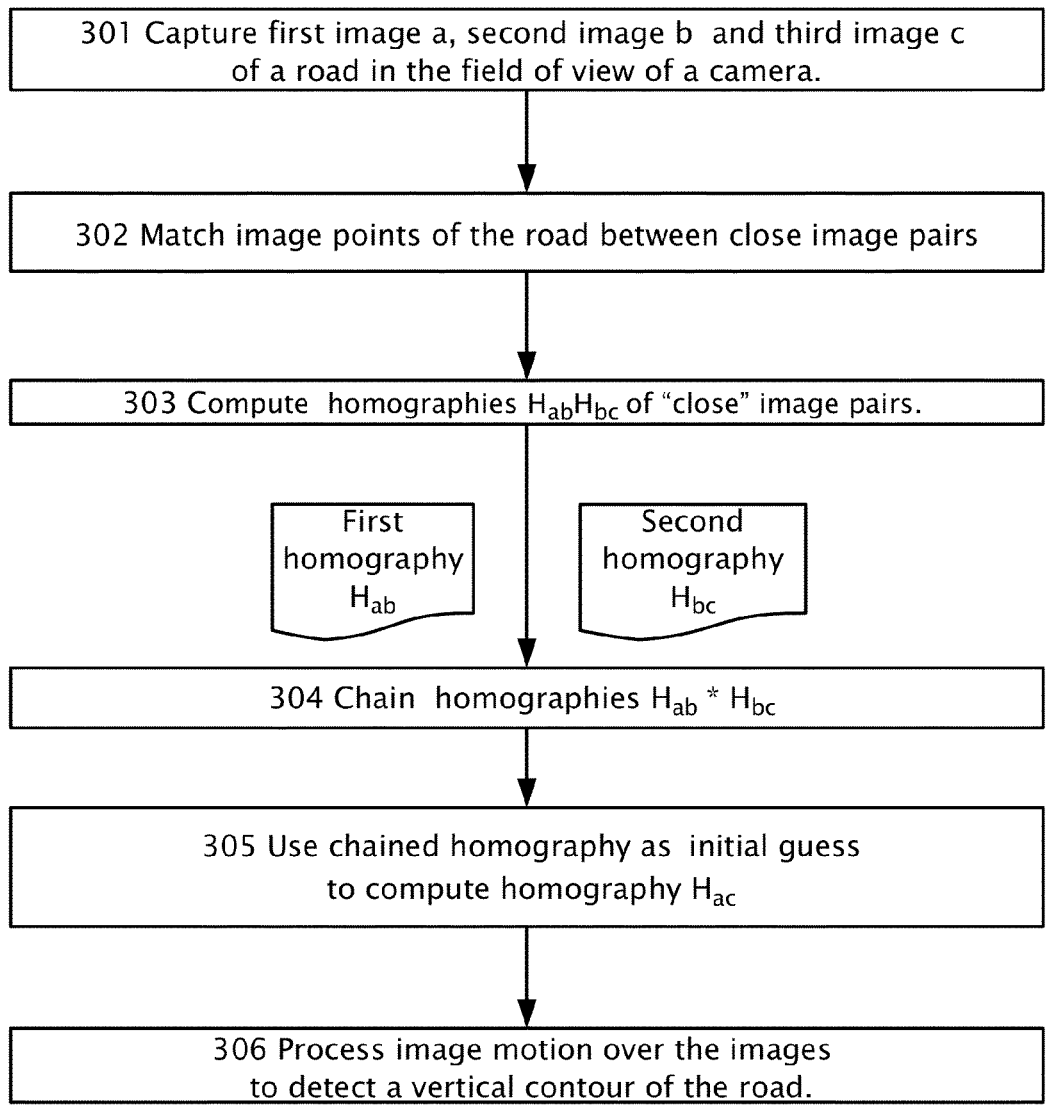
FIG. 3 shows a flow diagram of a simplified method for real time measurement of vertical contour of a road while a vehicle is moving along a road, according to a feature of the present invention.

Reference is now made to FIG. 3 which shows a flow diagram of simplified method 23 for real time measurement of vertical contour of a road while vehicle 18 is moving along a road, according to a feature of the present invention. In step 301, a first image frame 15, a second image frame 15 and a third image frame are captured of the same portion of road in the field of view of camera 12 mounted in vehicle 18. Image points of the road in the first image are matched (step 302) to corresponding image points of the road in the second image. Image points of the road in the second image are matched (step 302) to corresponding image points of the road in the third image. Homographies of "close" image pairs are computed. Specifically, a first homography $H_{ab}$ which transforms the first image of the road to the second image of the road may be computed (step 303) from matching image points the road in the first image a and corresponding image points of the road in the second image b. A second homography $H_{bc}$ which transforms the second image of the road to the third image of the road may also be computed (step 303) from matching image points the road in the second image b and corresponding image points of the road in the third image c. In step 304, the first and second homographies may be chained such as by matrix multiplication. By using the chained homography as an initial guess, a third homography $H_{ac}$ may be computed (step 305) which transforms the first image of the road to the third image of the road. Image motion from first image frame 15 to second and third image frames 15 may be processed (step 306) to detect a vertical contour in the road using the third homography $H_{ac}$. Further details of step 306 are shown in the description that follows.

Figure 4:
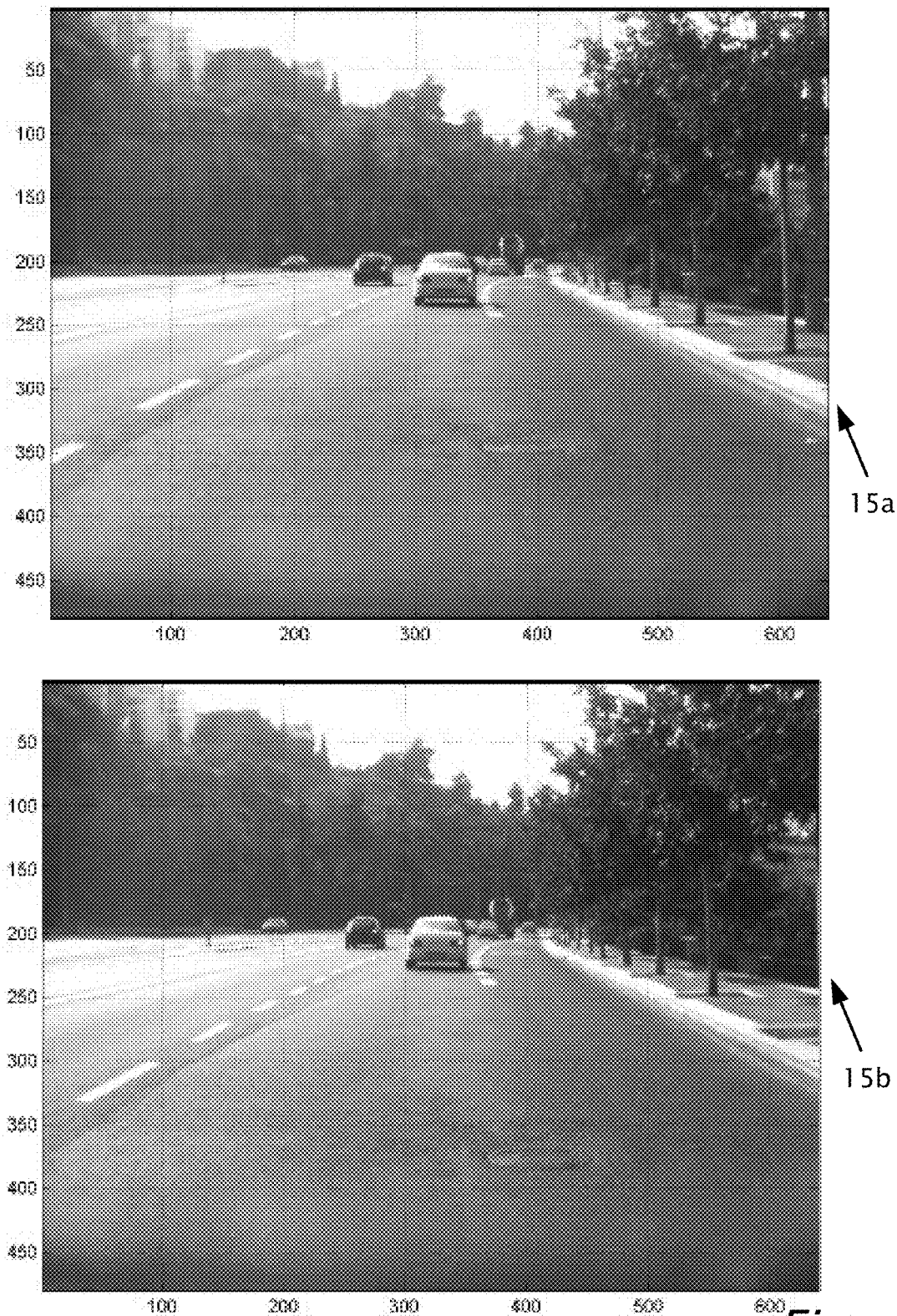
FIG. 4 shows two consecutive image frames captured from a forward looking camera mounted in a vehicle, according to a feature of the present invention.

Reference is now also made to FIG. 4 which shows two consecutive image frames 15a and 15b captured (step 303) from forward looking camera 12 mounted in a vehicle 18, according to a feature of the present invention. Image frame 15b is captured after image frame 15a is captured. Equivalently image frame 15b may be captured prior to capturing image frame 15a Camera 12 in the description that follows may be a WVGA camera (Aptina M9V024 and Sunny 4028A 5.7 mm lens) as used in the Mobileye™ advance warning system (AWS)™.

Figure 5:
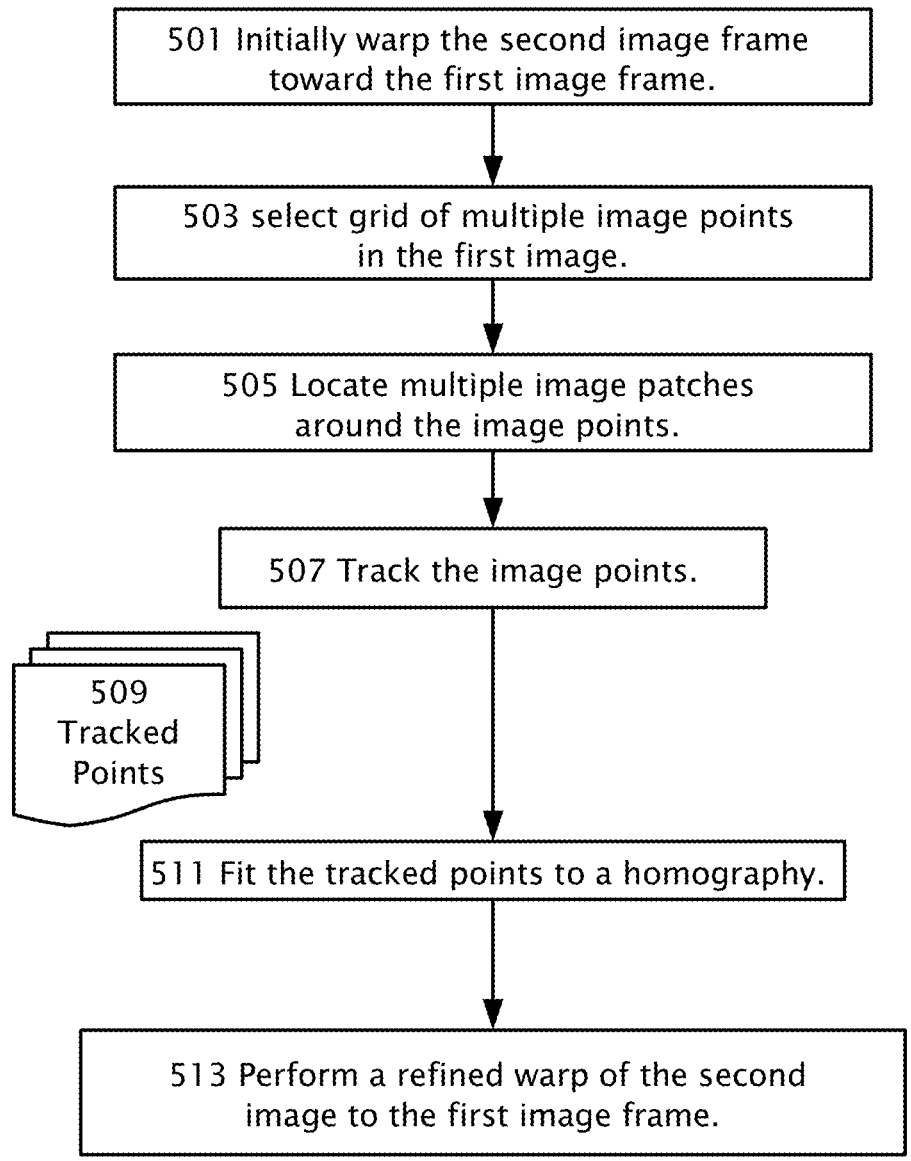
FIG. 5 includes a flow chart showing details of a processing step shown in FIG. 3, according to a feature of the present invention.
Figure 5:

Reference is now also made to FIG. 5 which includes a flow chart showing details of processing step 306, according to a feature of the present invention. The term "warping" as used herein refers to a transform from image space to image space.

Image frame 15b is initially warped (step 501) into image frame 15a. (In a similar process, image frame 15a may be initially warped into image frame 15b). It is assumed that a road can be modeled as an almost planar surface. Thus imaged points of the road will move in image space according to a homography.

In particular, by way of example, for a given camera 12 height (1.25 m), focal length (950 pixels) and vehicle motion between frames (1.58 m), it may be possible to predict the motion of the points on the road plane between the two image frames 15a and 15b respectively. Using a model of the almost planar surface for the motion of the road points, it is possible to warp the second image 15b towards the first image 15a. The following Matlab™ code would perform initial warp step 501:

```
[h,w]=size(Iin);
Iout=zeros(size(Iin));
for i=1:h,
    for j=1:w,
        x=j;
        y=i;
        S=dZ/(f*H);
        x1=x(:)-x0;
        y1=y(:)-y0;
        y2=y1./(1+y1*S);
        x2=x1./(1+y1*S);
        x2=x2+x0;
        y2=y2+y0;
        Iout(i,j)=bilinearInterpolate(Iin,x2,y2);
    end;
end;
``` where dZ is the forward motion of vehicle 18, H is camera 12 height and f is the focal length of camera 12. $p_0 = (x_0; y_0)$ is the vanishing point of the road structure. Alternatively, it may be may be possible to use initial calibration values during installation of system 1 in vehicle 18, where $x_0$ is the forward direction of the vehicle 18 and $y_0$ is the horizon line when vehicle 18 is on a horizontal surface. The variable S is an overall scale factor relating image coordinates between the two image frames 15a and 15b captured at different vehicle distances Z from camera 12. The term "relative scale change" as used herein refers to the overall scale change in image coordinates dependent upon distance Z to camera 12.

Figure 6:
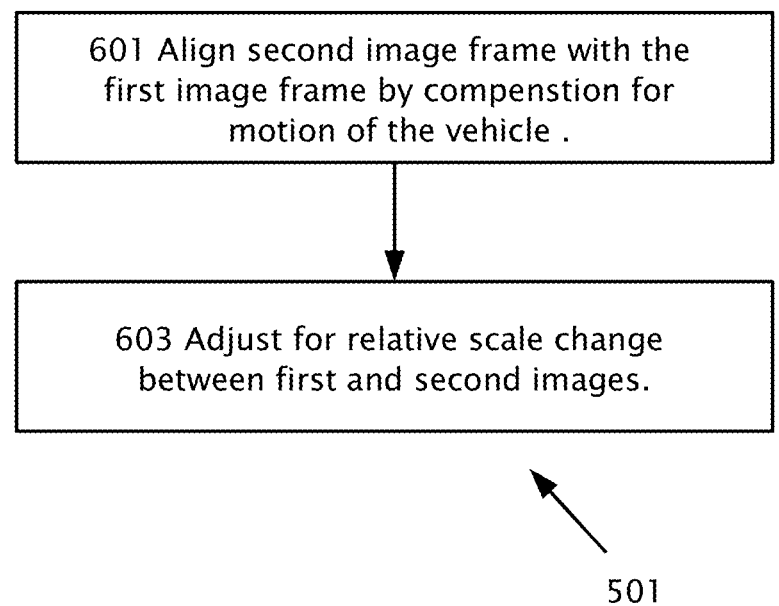
FIG. 6 includes a flow chart illustrating further details of an initial warping step shown in FIG. 5, according to feature of the present invention.

Reference is now made to FIG. 6 which includes a flow chart illustrating further details of initial warping step 501, according to feature of the present invention. According to the road model, image 15b is transformed by rotation (step 601) towards image 15a according to an estimate of yaw, pitch and roll that are available. The estimate may come from inertial sensors such as a yaw rate sensor in vehicle 18 or in camera 12 head. The estimate might also come from values computed from previous image frames 15. Initial warping based on planar road plane model in shown in step 603.

In practice, rotation (step 601) and the road model warp (step 603) can be combined into a single warp so only one step of bilinear interpolation is required. If only pitch and yaw are involved these can be approximated by image shifts. For example, yaw can be approximated a horizontal image shift $\delta\theta_{Pixels}$ from equations 1 and 2:

$$\delta\Theta = \delta t \times yawRate; \qquad (1)$$

$$\delta\Theta_{Pixels} = \frac{f\delta\Theta * \pi}{180} \qquad (2)$$

Figure 7A:
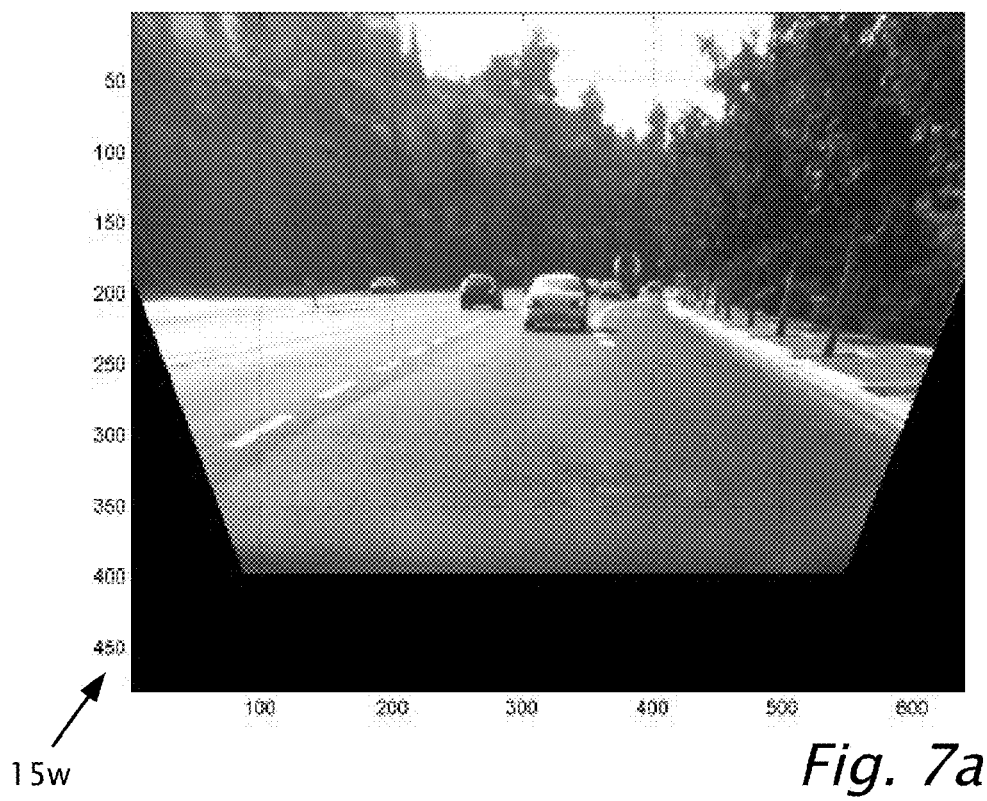
FIG. 7a shows the results of the initial warp step of FIG. 5, the results shown as a warped image, according to a feature of the present invention.

Reference is now made to FIG. 7a which shows the results of the initial warp step 501 of image 15b towards image 15a, the results are shown as warped image 15w, according to a feature of the present invention. The warp may be based on vehicle 18 motion (from the speedometer, inertial sensors etc.).

Figure 7B:
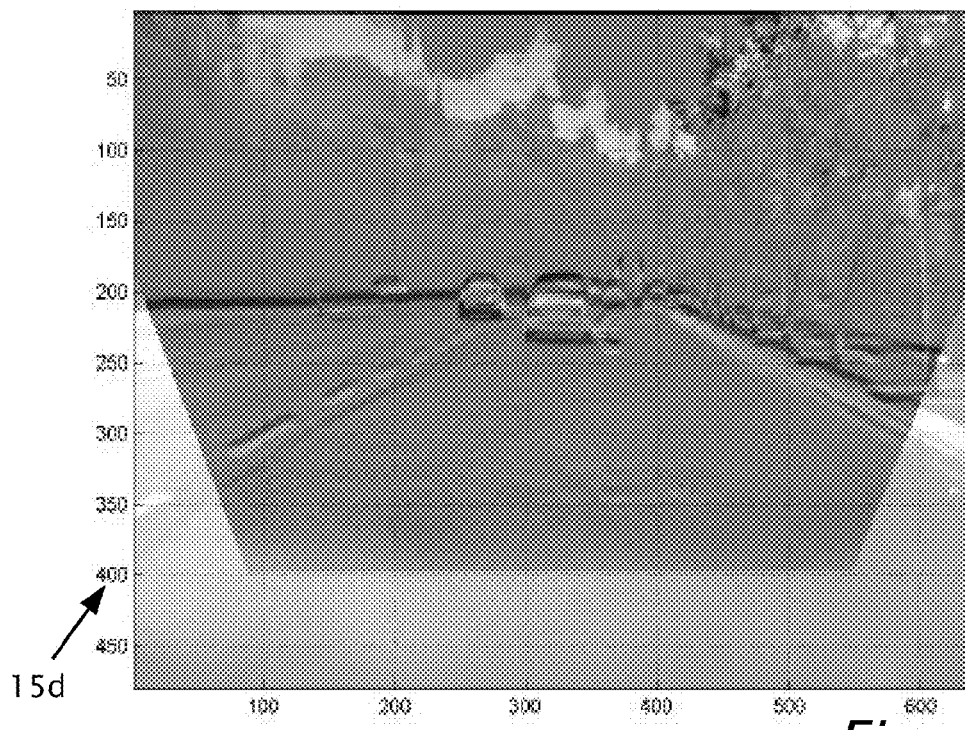
FIG. 7b shows a difference image as a result of the difference between the warped image of FIG. 7a and an image, according to a feature of the present invention.

Reference is now made to FIG. 7b which shows the difference between warped image 15w and image 15a shown as image 15d, according to a feature of the present invention. In FIG. 7b it can be seen that some features on the road are still not perfectly aligned.

Tracking of Points

After initial warp (step 501), the remaining motion of features on the road can be approximated locally, as a uniform translation of an image patch from image 15a to image 15w. This is not true of the motion between the original image 15a and un-warped image 15b, where the motion of a patch also involves a non-uniform scale change.

Figure 8A:
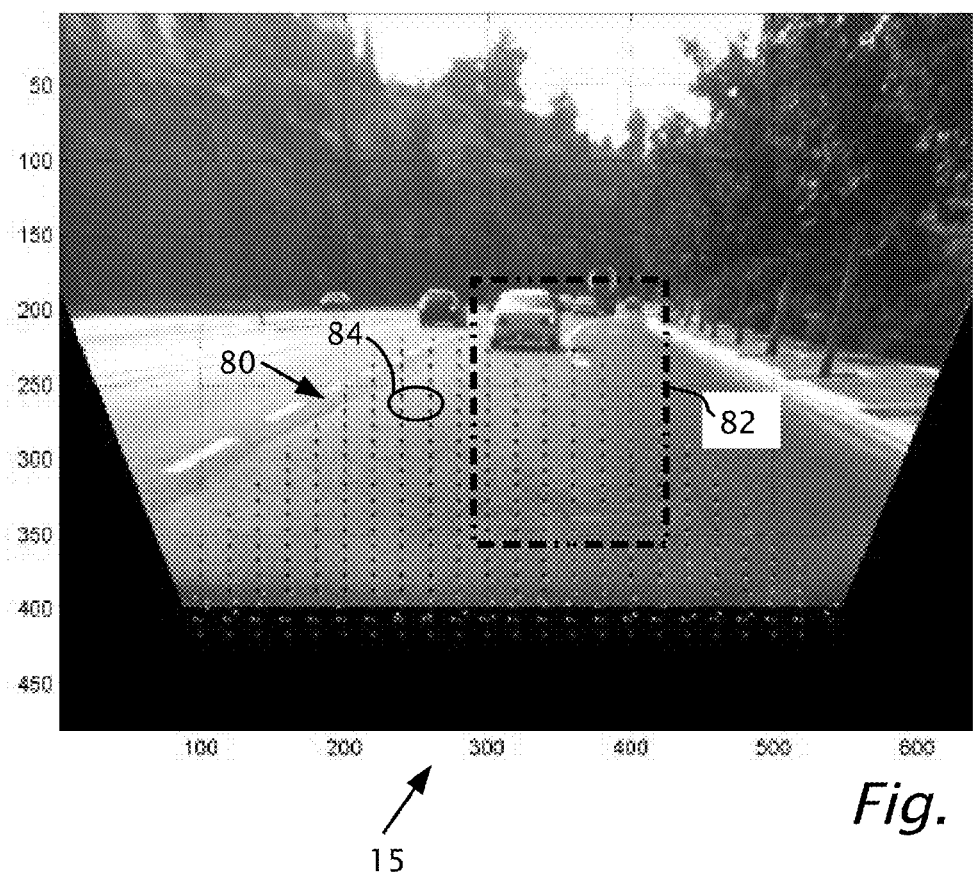
FIG. 8a shows a warped image frame with a trapezoidal region, according to a feature of the present invention.

Reference is now also made to FIG. 8a which shows warped image frame 15w with a trapezoidal region 80, according to a feature of the present invention. Instead of trying to find feature points, which would invariably give a bias towards strong features such as lane marks and shadows, a fixed grid 84 of points is used for tracking (step 507). Grid 84 of points are selected (step 503) from a trapezoidal region 80 that roughly maps to up 15 meters ahead and one lane in width. Points 84 are spaced every 20 pixels in the horizontal direction and 10 pixels in the vertical direction. An alternative would be to randomly select points according to a particular distribution.

Around each point in image 15a a patch is located (step 505). In this case the patch is 8 pixels in each direction centered around the point resulting in a 17×17 pixel square. The normalized correlation is then computed (e.g. Matlab™ function normxcorr2) for warped image 15w, where the patch center is shifted in the search region. In practical use there may be a yaw sensor but no pitch sensors and so a tighter search region is used in the x direction rather than in the y direction. A search region of (2×4+1) pixels in the x direction may be used and (2×10+1) pixels in the y direction.

The shift which gives the maximum correlation score was found and was followed by a refinement search around the best score position with a sub-pixel resolution of 0.1 pixels. This refinement step gave superior results to trying to fit the integer scores around the maximum score to a parabolic surface or spline and using these integer scores around the maximum score to compute a sub-pixel match. The refinement search with a sub-pixel resolution of 0.1 pixels also gave better results than Lukas Kanade flow which minimizes the sum square differences.

Invalid tracks may be filtered out at the search stage by picking those points with a score above a threshold (e.g. T=0.7) leaving tracked points 509 as a result of tracking step 507 and that the reverse tracking from warped image 15w to image 15a gives a similar value in the opposite direction. Reverse tracking is similar to left-right validation in stereo.

Figure 8B:
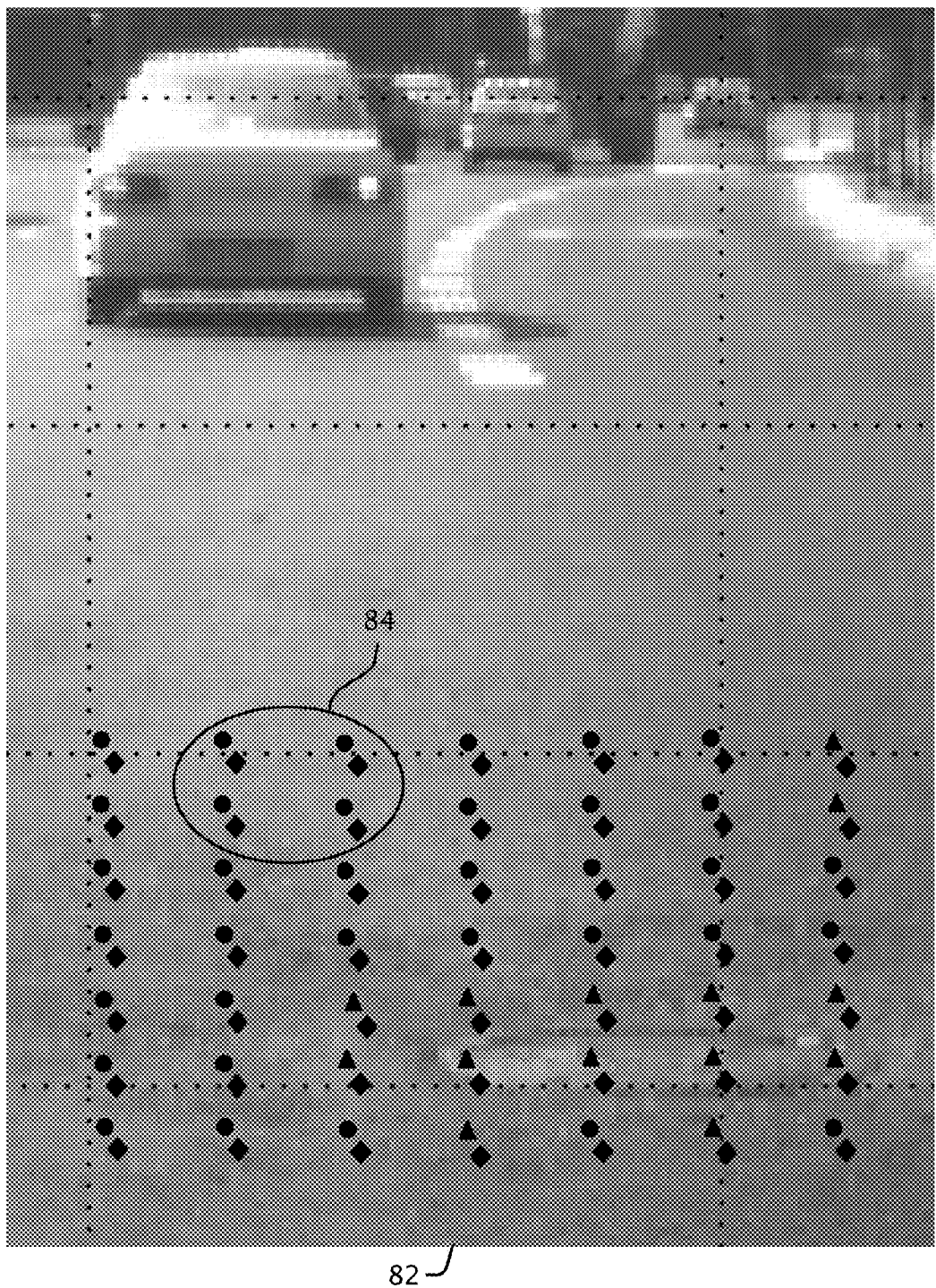
FIG. 8b shows a detail of the trapezoidal region in warped image frame of FIG. 8a, according to a feature of the present invention.

Reference is now also made to FIG. 8b which shows a detail 82 of trapezoidal region 80 in warped image frame 15w, according to a feature of the present invention. Triangle and circle points 84 are the starting location. Diamond points are the corresponding tracked location. Inliers are shown as circles and outliers are shown as triangles.

Robust Fitting

Tracked points 509 as a result of tracking step 507, are fit to a homography (step 511) using RANdom SAmple Consensus (RANSAC). A number, e.g. four, of points are chosen at random and used to compute the homography. Points 509 are then transformed using the homography and the number of points which are closer than a threshold are counted. Randomly choosing 4 points and counting the number of points which are closer than a threshold is repeated many times and the four points that gave the highest count are retained.

At the end of the process, the four best points are used to again (step 513) transform the points and all the points (inliers) that are closer than a (possibly different) threshold are used to compute a homography using least squares. The rest of the points that are not closer than a (possibly different) threshold are considered outliers.

At this point in the process, the number of inliers and their spread in warped image 15w give an indication to the success of finding the road plane model. It is usual to get over 100 inliers and a good fit. FIG. 8b shows the inliers as circles and outliers as triangles. The homography can then be used to correct the initial alignment warp (step 501). Correction of the initial alignment warp can be done by integrating the correction into the initial warp (step 501) or to do the two warps consecutively. The former is advantageous as it requires only one interpolation step and can be performed optionally by matrix multiplication of the two homography matrices.

Figure 9A:
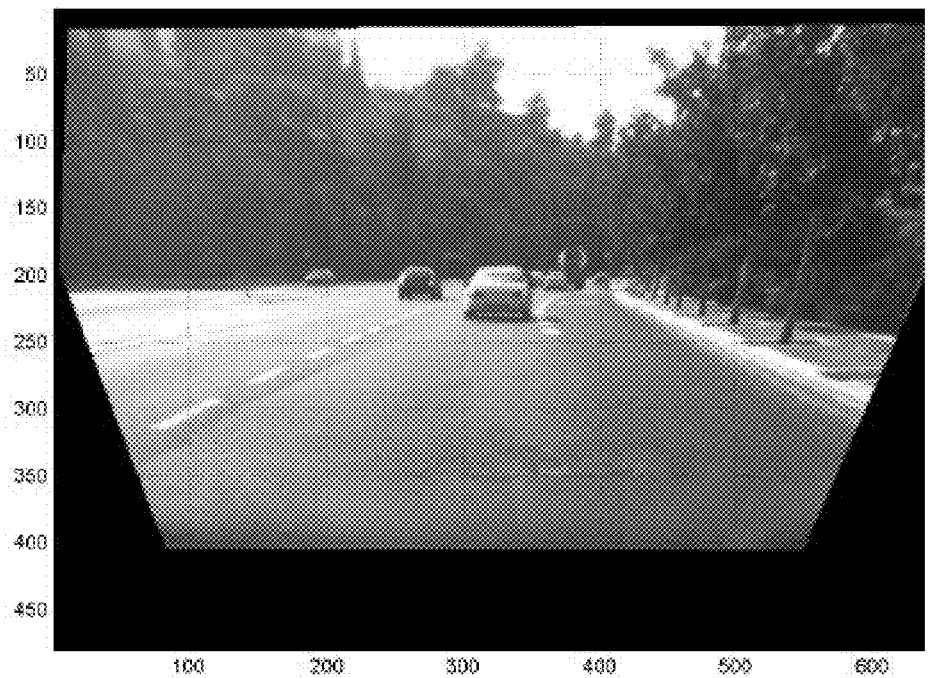
FIG. 9a shows the results of the refined warp of a warped image towards an image, according to a feature of the present invention.

Reference is now made to FIG. 9a which shows the results of the refined warp of warped image 15w towards image 15a, according to a feature of the present invention. In FIG. 9a, features on the road are almost perfectly aligned. There are however, still some brightness differences that are not accounted for.

Figure 9B:
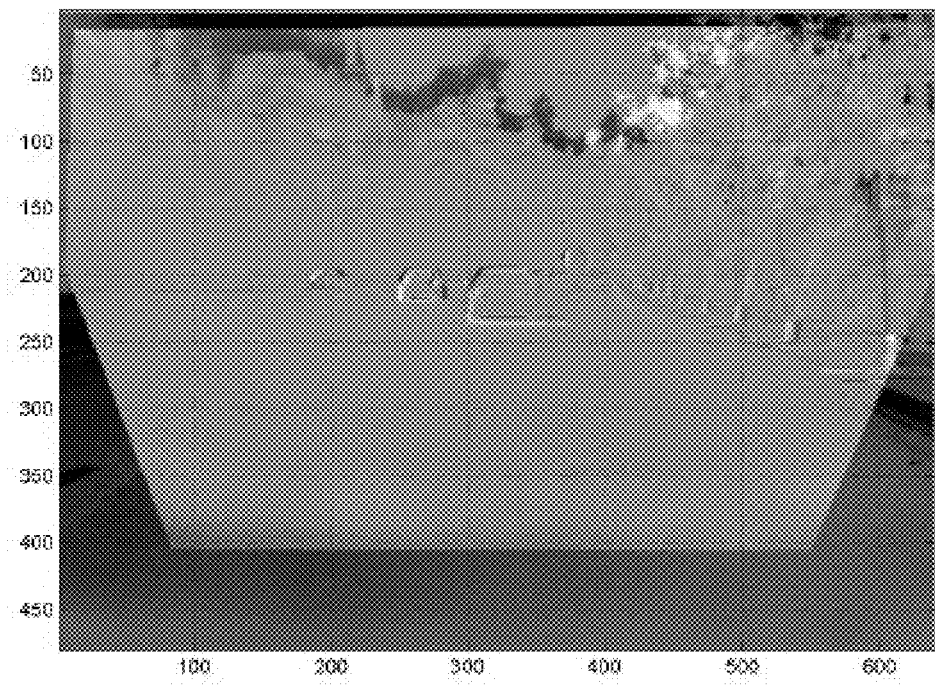
FIG. 9b shows the difference between the refined warp of a warped image towards an image and the image, according to a feature of the present invention.

Reference is now made to FIG. 9b which shows the difference between the refined warp of warped image 15w towards image 15a and image 15a, according to a feature of the present invention.

Dense Tracking and Residual Flow

After warping image 15b towards image 15a to give warped image 15w, using the refined warp (step 513), the tracking of points (step 507) may be repeated using a finer grid (e.g. every 5th pixel on every 5th row) and over a wider region of the road. Since the road plane is very well aligned, a smaller region may be searched over such as 2 pixels in each direction, again, with a subpixel search.

Figure 10A:
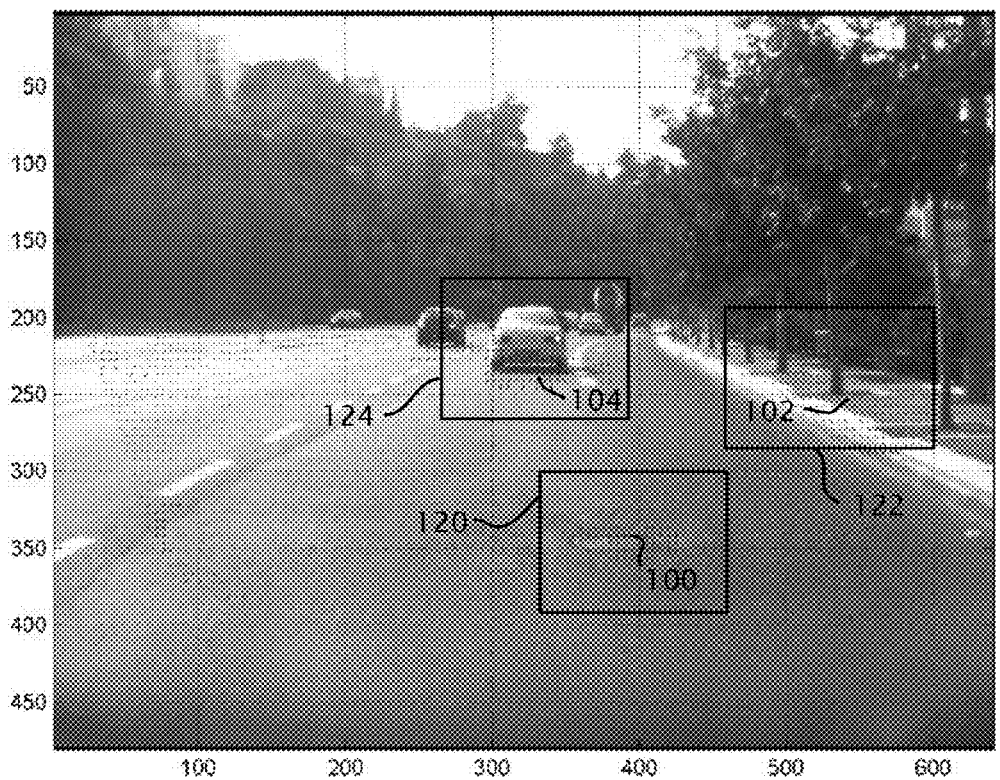
FIG. 10a shows the results of tracking a dense grid of points, according to a feature of the present invention.
Figure 10B:
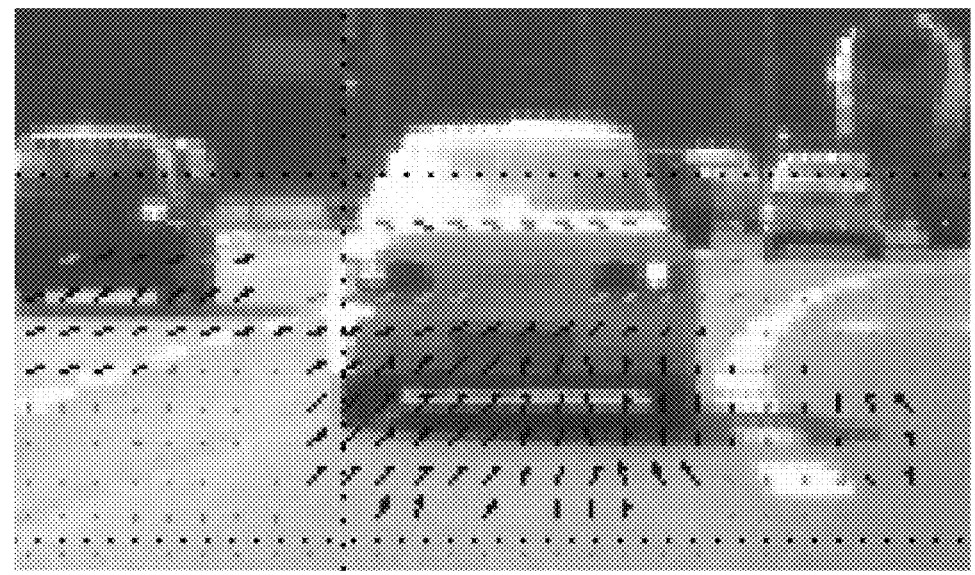
FIGS. 10b, 10c and 10d show details of areas indicated in FIG. 10a, according to a feature of the present invention.
Figure 10C:
Figure 10D:
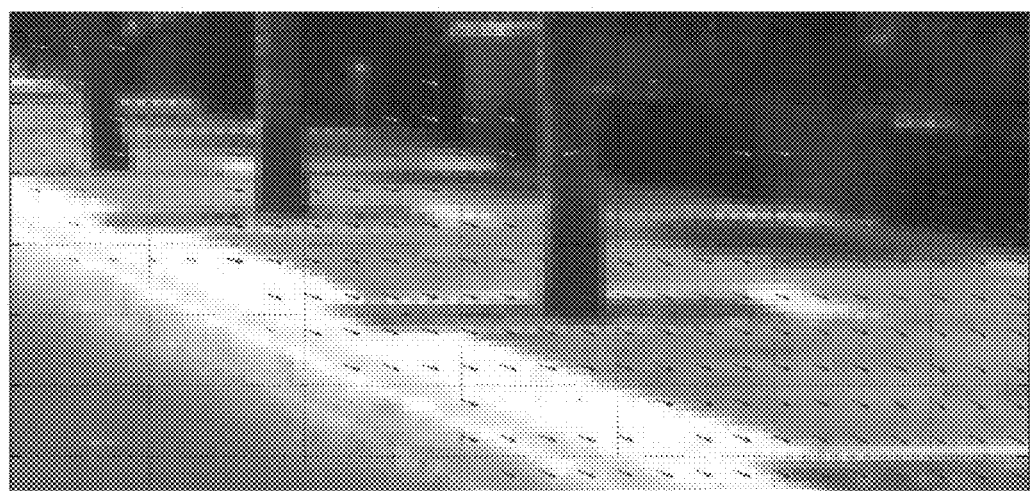

Reference is now made to FIG. 10a which shows the results of tracking a dense grid of points, according to a feature of the present invention. FIG. 10a includes area 124 with a car and shadow 104 on the car. Also areas 120 and 122 which include manhole cover 100 and sidewalk 102 respectively. FIGS. 10b, 10c and 10d show greater details of areas 124, 120 and 122 respectively.

Results are shown in FIGS. 10a-10d as a Matlab™ quiver plot. The Matlab™ quiver plot displays velocity vectors as arrows with components (u,v) at the points (x,y). For example, the first vector is defined by components u(1),v(1) and is displayed at the point x(1),y(1). Quiver(x,y,u,v) plots vectors as arrows at the coordinates specified in each corresponding pair of elements in x and y. Points on the road should exhibit flow close to zero. Points on features above the road plane will have flow greater than zero and points below the road plane will have residual flow below zero. Positive flow is defined as flow away from the focus of expansion (FOE) (generally speaking down and outwards). Note that the elevated sidewalk 102 as shown in FIG. 10d and sunken manhole cover 100 as shown in FIG. 10c both show up well. Objects which are not fixed to the road also show significant residual flow as on the car and the shadow 104 on the car. Points with flow above 0.5 pixels are shown in the elevated sidewalk 102 and points with flow below −0.5 pixels are shown on the sunken manhole cover 100, on the car and the shadow 104 on the car.

Sidewalks can thus be detected by detecting relatively homogenous positive residual flow regions that are separated from areas of low residual flow by elongated lines. These lines are roughly heading in the direction of the FOE or the direction of the road (i.e. the direction of the vanishing points of the lane marks).

Significant robustness to noise can be achieved by combining information from neighboring points (i.e. applying some sort of smoothness constraint) by using global cost functions with variational approaches or by using dynamic programming.

Variational Approaches

As a first, the Horn And Schunk optical flow computation may be applied between image 15*a* and warped image 15*b*. (Horn, B. K. P. & B. G. Schunck, "Determining Optical Flow", *Artificial Intelligence*, Vol. 17, No. 1-3, August 1981, pp. 185-203) Since the images are well aligned the algorithm can converge quite well. Horn and Schunk use quadratic error functions for both the data and the error terms. Better results can be obtained using L1 errors terms. The optical flow code of Ce Liu (C. Liu. Beyond pixels: exploring new representations and applications for motion analysis. Doctoral Thesis. Massachusetts Institute of Technology. May 2009. Appendix A pages 143-148) works quite well. The code is by Ce Liu based on the work of Brox et al. (T. Brox, A. Bruhn, N. Papenberg, and J. Weickert. High accuracy optical flow estimation based on a theory for warping. In *European Conference on Computer Vision* (ECCV), pages 25-36, 2004.)

However, some changes are made to the code of Ce Liu. When using the variational approach the computation is restricted to only one level of the pyramid (the nest or original level) for two reasons:

1. Often the texture on the road is very fine and only the texture can be seen in the highest resolution image and not in upper levels of the pyramid. Typically there is no coarse texture on the road so coarse-to-fine does not work.

2. The solution should not be pulled towards the significant, coarse scale brightness features. Otherwise the solution will be pulled away from the well aligned starting point and never recover.

A further term may be added to the cost function which penalizes for straying far from the planar model (i.e. for flow above 1 pixel or some other threshold). The function:

$$\lambda \Sigma (u^2 + v^2)^a \quad (3)$$

works well where u and v are the values of the flow in x and y respectively, a determines the shape of the cost term. a=4 works well. λ weights this cost term compared to the data term and the smoothness term.

In order to reduce the effects of brightness changes between images, a bandpass or high-pass filtering may be performed. For example:

f=ones(5);
f=f/sum(f(:));
f=conv2(f,f);
f=conv2(f,f);
f=conv2(f,f);
im1f=conv2(im1,f,'same');
im2f=conv2(im2,f,'same');
im1=im1−im1f;
im2=im2−im2f;

The optical flow computation may be applied to only the part of the image typically occupied by the road. For example by starting only from the horizon down, remove 100 columns on the left and right and also the bottom part of image 15*a* which does not appear in warped image 15*w* (and is zero in the warped image, see FIG. 9*a*).

Figure 11:
FIG. 11 shows two filtered and cut images that are fed into an optical flow routine executed in Matlab™, according to a feature of the present invention.
Figure 11:

In Matlab™ code that is:

im1=im1(200:400,100:540);

im2=im2(200:400,100:540);

Reference is now made to FIG. 11 which shows two filtered and cut images that are fed into the optical flow routine in the Matlab™ codes above, according to a feature of the present invention. The two images filtered and cropped to be used as input to the optical flow routine have the road texture enhanced by the high-pass filtering.

Figure 12:
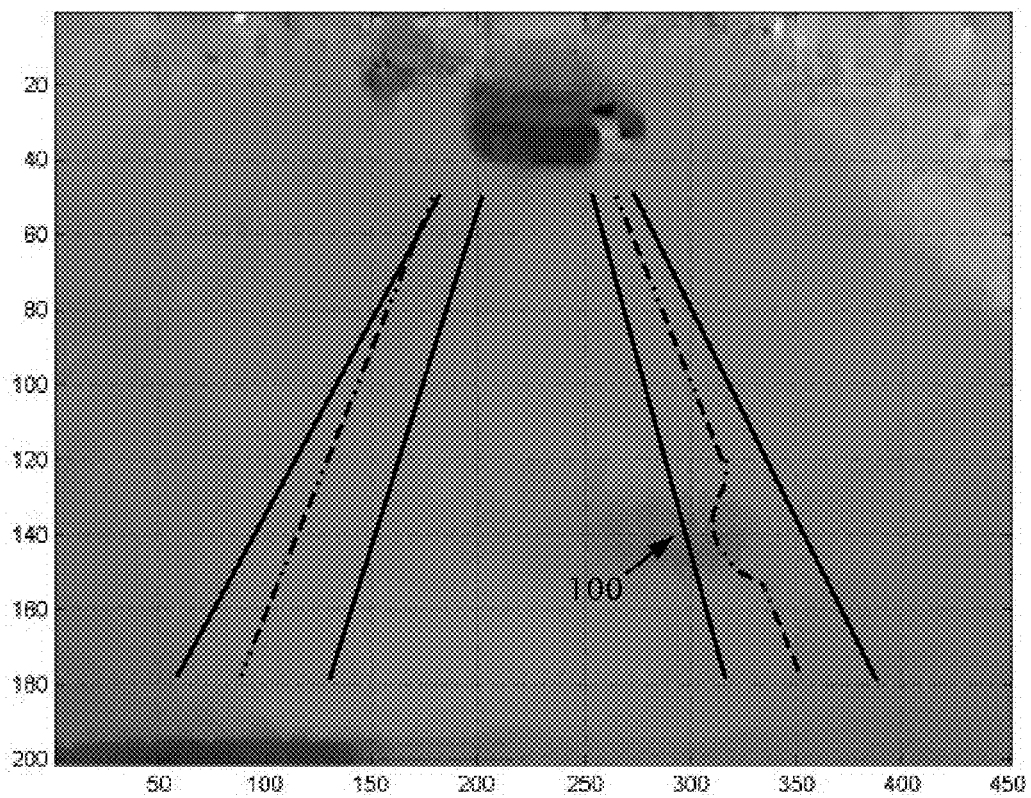
FIG. 12 shows the y component of the residual optical flow as a gray scale image, according to a feature of the present invention.

Reference is now made to FIG. 12 which shows the y component of the residual optical flow as a gray scale image, according to a feature of the present invention. Note the dark patch centered around (300,140) on the horizontal and vertical axis respectively. The dark patch is due to the negative residual flow on manhole cover 100 which is sunken in the road. The solid lines indicate tracks 0.5 m wide in front of the host vehicle wheels. The dotted line is the row average of the data between each pair of solid lines. The data is scaled by 30 to make the shape of the data visible. Note the significant dip in the right dotted red line due to the manhole cover 100. The residual optical flow may be used to detect a hazard of height above the road of ten centimeters at a distance of more than thirty meters using a 1280×960 pixel sensor and a 46 degree horizontal field of view lens. Range can be increased by changing the camera parameters, increasing the motion between images and adjusting various other parameters.

Figure 13:
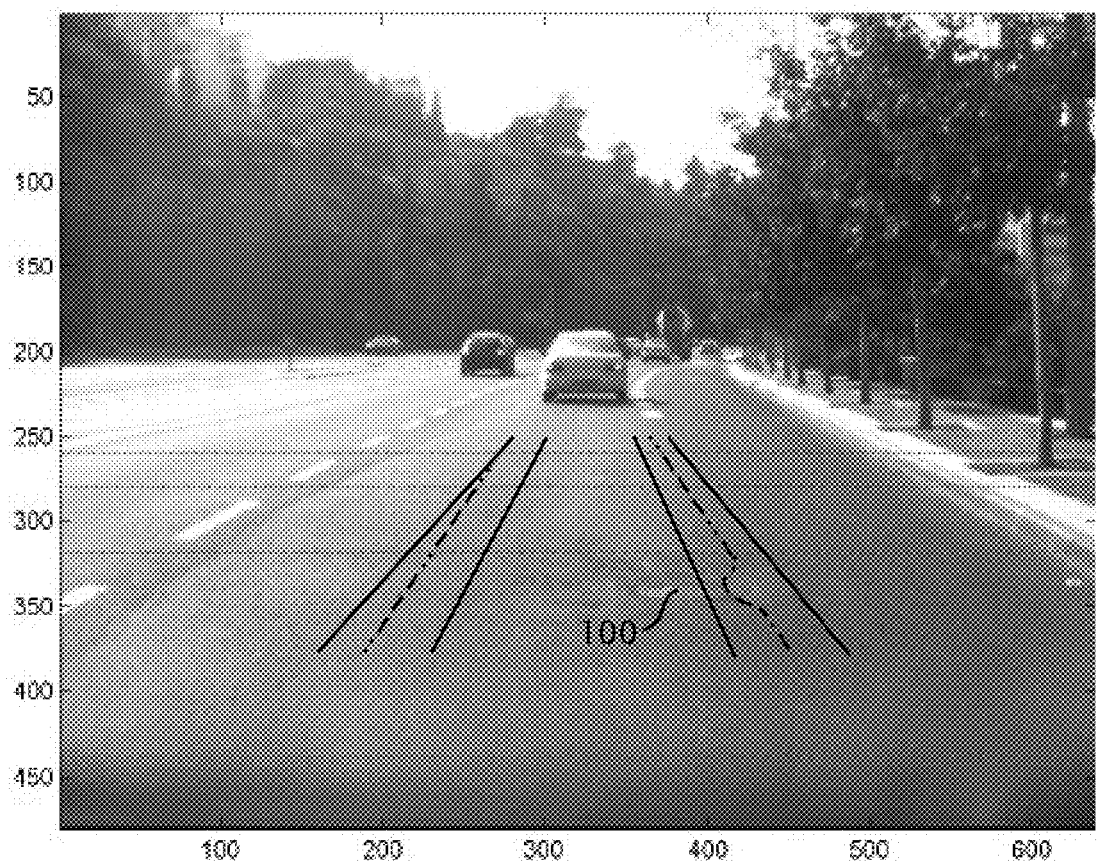
FIG. 13 shows the same data as shown in FIG. 12 overlaid on an original image, according to a feature of the present invention.

Reference is now made to FIG. 13 which shows the same data as shown in FIG. 12 overlaid on the original image 15*a*, according to a feature of the present invention. The solid lines indicate tracks 0.5 m wide in front of the host vehicle wheels. The dotted line is the row average of the data between each pair of solid lines.

Figure 14:
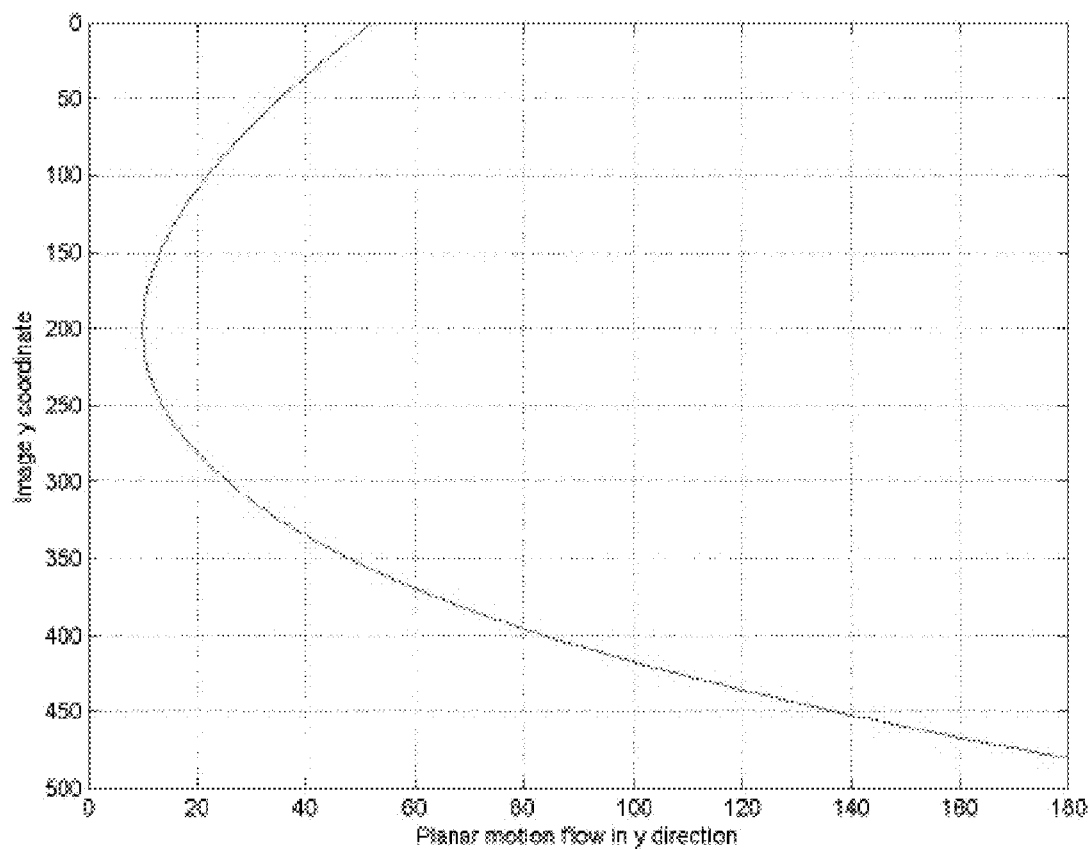
FIG. 14 which shows a graph of image y co-ordinate versus planar motion flow in the y direction, according to a feature of the present invention.

Reference is now made to FIG. 14 which shows a graph of image y co-ordinate versus planar motion flow in the y direction, according to a feature of the present invention. The same information shown in FIGS. 12 and 13 can be converted to metric values. First it is assumed that the rotation warp, initial warp and refinement warp have been combined into a single warp. With the single warp, there is now effectively a function that accurately maps points on the road from image 15*a* to image 15*b*. FIG. 14 shows the expected flow in the y direction according to the planar model. Flow has been plotted on the x axis so that the y axis aligns with the y axis of the warped image 15*w*.

The y coordinate of the minimum flow corresponds to $y_0$ of the image space of image 15*a*, in other words the horizon or vanishing point of the road in image 15*a*. In the case of FIG. 14, image co-ordinate y=200. The x coordinate of the minimum is the change in the value for $y_0$ between image 15*a* and warped image 15*w*. The change in the value for $y_0$ between image 15*a* and warped image 15*w* is in effect the actual pitch value in pixels. In the case shown in FIG. 14 the actual pitch value is 10 pixels.

Given $y_0$ it is easy to translate row coordinates into distance on the road plane:

$$Z = \frac{fH}{y - y_0} \quad (4)$$

The flow of the road plane due to forward motion alone (i.e. after compensating for pitch) is given by the combined warp value minus the pitch. Let v be the flow for the road plane and δv; be the residual flow. Then the height of the point from the road δH is given by:

$$\delta H = \frac{\delta v}{v} H \quad (5)$$

Figure 15:
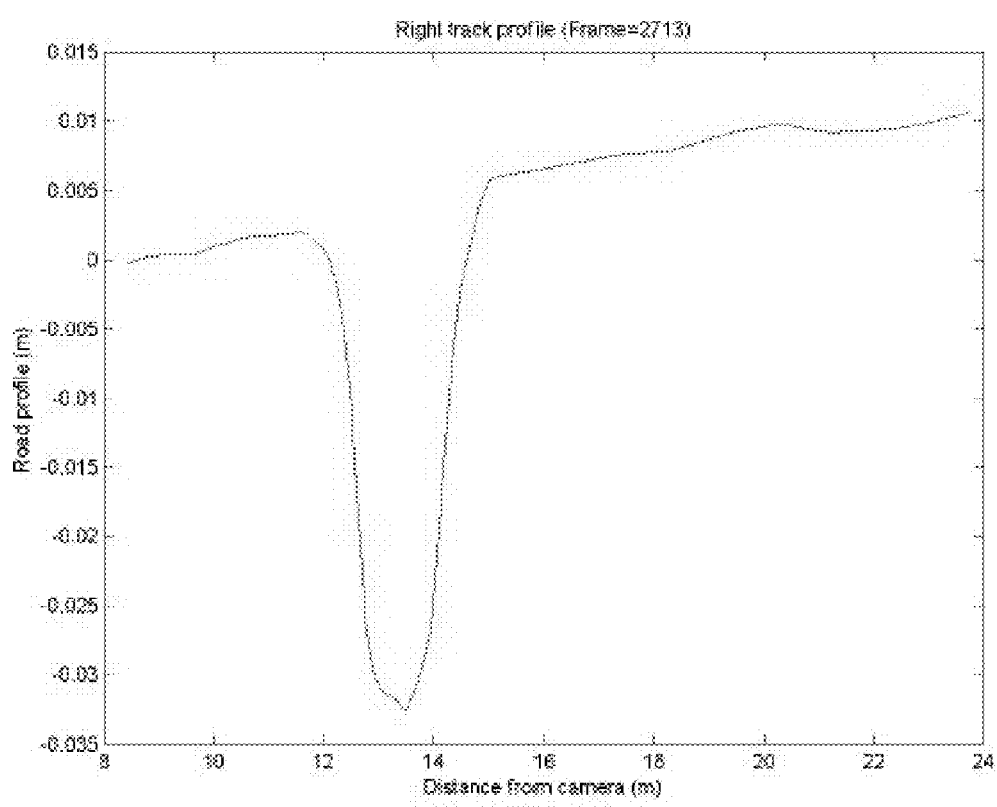
FIG. 15 shows a graph of road profile in meters versus distance from a camera in meters, according to a feature of the present invention.

Reference is now made to FIG. 15 which shows a graph of road profile in meters versus distance from camera 12 in meters. FIG. 15 shows the road profile of the right hand track of FIG. 12 in metric units of distance and height.

Dynamic Programming

In the use of dynamic programming it is assumed that for a narrow track, such as a track 0.5 m wide (as shown in FIG. 13) and extending 20 m in front of one of the wheels of vehicle 18, the road surface can be modeled as a one dimensional function of the distance on the road Z.

For each point in the strip the normalized correlation may be computed in a small search region around the point to sub pixel accuracy. The normalized correlation computed in a small search region is similar to the fine resolution grid described above. However, instead of picking the highest correlation for each point as before, the average correlation score along the row is computed for each possible residual flow and robust averaging to remove outliers may used.

Next is to find a function δv; as a function of y or δH as a function of Z, that maximizes the total correlation score and some smoothness score. It is also possible to add a term penalizing for deviations from the planar model.

A one dimensional optimization problem of this kind leads itself to dynamic programming. For the first row, the score for each residual flow is computed in the given range (e.g. 2 pixels). Then for each row n+1, the score associated with the average correlation score along row n+1 is computed. Also the score for each residual flow which is the best score taking into account the cumulative scores in row N and the smoothness score between this residual flow and the residual flows in row n is computed.

To be more explicit, a N×M table is set up, where N is the number of image rows in the track (for example, the 150 rows between 250 and 400) and M is the search space of residual flow. For example the 21 values: [−1:0.1:1]. The first of the N rows is simply the average correlation score given each residual flow: $S_{NC}(1, i)$ for each residual flow in the range [−1:0.1:1].

$$T(1,i) = S_{NC}(1,i) \quad (6)$$

For the general row n where n=2 to N, the value for table entry T (n, j) is a combination the average correlation score for row n for residual motion $j(S_{NC}(n, j))$, and the score that maximizes the combination of T (n−1, i) and the smoothness score $S_{sm}(i, j)$.

$$T(n,j) = \Psi(S_{NC}(n,j), \text{Max}_i(\Phi(T(n-1,i), S_{sm}(i,j)))) \quad (7)$$

where Ψ and Φ are functions that combine the scores. A simple function could be addition. After the table has been filled one performs back-tracing to get the optimal path, which describes the surface.

Updates to the Single Frame System

Computation Direction

In earlier versions the later frame was warped towards the earlier frame and the road profile was computed in the earlier frames coordinate system. A later version reverses this and warps the earlier image towards the most recent image and the road profile is computed in this most recent coordinate frame. The computation is the same but it has the following advantages:

1. Warping the earlier image towards the most recent image gives the results in the most relevant coordinate frame for the application.
2. When driving forward (the typical situation) all the road that appears in the most recent image has been viewed in the earlier images. There are no 'black' regions as appear for example in FIG. 7b.
3. It makes it easier to implement the multi-frame concept.

Picking the Frames

The current frame is picked as frame 2 and then a search back is made through the frames to find the closest previous frame where the vehicle motion was above a certain value (for example 1m). The vehicle motion above a certain value is based on the vehicle speed and the time stamps of the frames. This frame is denoted frame 1.

Initial Motion Warp

The parameters for the initial motion warp can be determined from inertial sensors or from the images themselves or a mixture of the two. For example, in a typical modern car, the speed is available also yaw rate. Pitch rate might not be available and will be estimated from the image.

It is more convenient to implement the warps using homography matrices. That way the warps can be combined together into a single warp.

At the initial motion warp stage, approximations can be used such as performing the yaw and pitch warps as shifts and ignore roll. The later alignment stage will correct for any affine and projective motion.

The yaw rotation between the images is based on the yaw angle theta converted into pixels. A homography matrix is then constructed to shift the image:
dTheta=dt*yawRate;
dThetaPix=f*dTheta*pi/180
dx=round(dThetaPix);
Hdx=eye(3);
Hdx(1,3)=dx;

The pitch between the images is determined from the images by tracking large patch centered on the horizon (for a high resolution 1280×960 pixel image the patch is 400 pixel wide and 200 pixel high). The patch is tracked over ±80 pixels in the vertical direction and the best match is used as the pitch value. As an alternative the region can be tessellated into sub-patches, each path tracked and a median value used. A homography matrix is then constructed to shift the image:
% find pitch and rotate around X axis(approximate as shift) based on pitch
dy=findMotionY(I2,I1,y0)
Hdy=eye(3);
Hdy(2,3)=dy;

The vehicle speed, focal length and camera height are used to compute the expected road motion. The expected road motion also is a homography:
Hs1=eye(3);
Hs1(1,3)=−x0;
Hs1(2,3)=−y0;
S=dZ/(f*H);
Hs2=eye(3);
Hs2(3,2)=S;
Hs3=eye(3);
Hs3(1,3)=x0;
Hs3(2,3)=y0;
Hw=Hs3*Hs2*Hs1;

The three homographies are then multiplied together to form the complete transformation:
Hall=Hw*Hdy*Hdx;
I1hw=homoWarp1(I1orig,Hall);
I1w=I1hw;

Tracking of Points and Robust Fitting

The result of the RANSAC is the correction homography H2fixed to the initial warp Hall. The correction homography H2fixed and the initial warp Hall can be multiplied together to give the accurate homography of the road plane from previous image 1 to current image 2.

H2final=Hall*H2fixed

The accurate homography matrix denoted A' is composed of the camera 12 motion:

$$(R, \vec{T})$$

and the plane normal:

$$\vec{N}'$$

the camera-plane distance d'π and the camera matrices K and K':

$$A' = K\left(R^{-1} + \frac{\vec{T}\vec{N}'^T}{d'_\pi}\right)K'^{-1} \qquad (8)$$

The (') is used to denote terms in the coordinate system of the second image. Since the camera matrices K and K' are the same and are known, the homography matrix A' can be broken down into its components:

$$R, \vec{N} \text{ and } \frac{\vec{T}}{d'_\pi}$$

Dense Tracking and Residual Flow

Instead of computing the dense flow over the whole image, the path of the vehicle is predicted based on yaw rate and steering angle and given the left and right wheel positions relative to the camera. For each wheel, a path of width 0.5 m for example, is projected on to the image using the parameters of the plane. For every fifth image row along this path, the path width is divided into 11 grid points which represent every 0.05 m The path width divided into 11 grid points which represent every 0.05 m, gives a well defined set of grid points along the path (of each wheel). Tracking is performed between image 2 and the warped image 1, for patches of size 17×17 or 9×9 pixels centered around each grid point. A search region of ±8 pixels in both x and y is used, including sub-pixel resolution search in the y direction. Sub-pixel resolution search in the x direction can also be performed but tests did not show improved performance and sub-pixel resolution search in the x direction increases computation time. As an optimization, the search region for each pixel can be optimized based on each pixel position in the image and the location of the focus of expansion (FOE), since the flow is expected only on lines passing through the FOE.

An alternative optimization would be to rectify the images so that the FOE is mapped to infinity, the viewpoint is mapped to an overhead view point and the flow becomes vertical. The alternative optimization is very similar to rectification in two camera stereo systems. However, given that the transformation on the image is quite different for different distances along the road, it would be advantageous to perform the rectification separately for horizontal strips in the image. For each strip there would be one row where the width does bot change significantly. Row above the one row would extend and rows below would shorten. For example, for a road region of 5 m to 20 m one can warp one strip 5 m to 10 m centered around 7 m. A second strip can be 8 m to 16 m centered around 11 m and a third strip can be from 14 m to 22 m centered around 17 m.

The strips would not extend the whole width of the image but only wide enough to cover the wheel tracks with a margin to allow for the patch size.

For each point a validity bit is set based on forward-backward verification, a minimal correlation value and thresholds on allowed x and y flow values. For each row, the median of the valid points out of the 11 points along the row is taken as the value for that row. The number of valid points along the row is a confidence value. For a row with no valid points a residual flow value is interpolated from valid neighbor points above and below.

A further smoothing step can be used. For example, a median filter of width three can be used followed by a averaging filter of width three. This gives the residual flow:

$$\vec{\mu}$$

which is known to be:

$$\vec{\mu} = \frac{H}{Z}\frac{T_z}{d'_\pi}(\vec{e} - \vec{p}_w) \qquad (9)$$

where H is the height of the point from the reference frame. Given the residual flow for each point along the path the equation can be solved for H.

While it is convenient to perform the fine tracking in pixel and sub pixel resolution it is also possible to define the search areas in terms of height above or below the plane. For example instead of a search from −2 pixels to 2 pixels with subpixel resolution at 0.1 pixel accuracy, it is possible to search for a height between −0.2 m and 0.2 m at 0.01 m increments. A search for a height of between −0.2 m and 0.2 m at 0.01 m increments requires translating the height to a pixel shift and performing the normalized cross correlation. The search is more expensive but allows imposing metric smoothness constraints in the initial cost function.

The search can also allow a method for combining information from three or more motions. Consider a sequence of three frames 1, 2 and 3.
1. Warp frames 1 and 3 towards frame 2.
2. Track points and keep valid points that tracked well from 1 to 2 and 3 to 2.
3. Perform RANSAC, picking 4 points from image 2 and computing homographies from images 1 and 3. However the inlier count is the minimum of inliers from the mapping 1 to 2 and 3 to 2.
4. Compute final homographies from 1 to 2 and 3 to 2 and warp images.
5. For points along the wheel tracks, perform a search for best height from the reference plane. For each height compute the residual pixel motion from 2 to 1 and from 2 to 3 separately, compute the normalized correlation scores separately and average (or minimum or maximum). Alternatively one can compute a combined normalized correlation score.
6. Pick best score.

Multi-Frame Analysis

The system can detect shape features and bumps that are a few centimeters high at distance of greater than 10 m. Naturally there is also some noise in the system and spurious bumps are detected. However real shape features will move consistently with the movement of the vehicle, while spurious shape features due to noise will appear randomly or might be stationary in the image if they are due to imaging artifacts. Shape features due to moving objects will also not move consistently with the vehicle.

It is therefore, useful to accumulate information over time. One method would be to use plane information and the road profile information to create a road profile in 3D (X,Y,Z) coordinates and then use the ego motion of the vehicle to transform the model from frame to frame. A Kalman filter could be used.

Another method uses the homography itself to carry information from frame to frame over time. Using the homography itself to carry information from frame to frame over time takes advantage of the fact the road profile is defined on a road surface and the actual deviations due to the shape features are within 1 or 2 pixels, much smaller than the size of the surface regions or patches are being considered. The basic multi-frame algorithm is as follows:

1. Assume a multi-frame road profile has been computed for frame n−m, where m is often equal 1 but might be larger if computing a profile for each frame is not required.
2. Compute the single frame road profile for frame n using frame n and frame n−k where k might not be equal to m. Typically k is chosen so that the vehicle motion is above a certain value such as one meter.
3. The multi-frame profile and the single plane profile use different reference planes. The different reference planes are often very similar since they are determined by the same road with significant areas of overlap but when passing over a speed bump the assumption that the reference frames are very similar breaks down. It is therefore important to compensate for passing over a speed bump by:
(a) Let $\pi_m$ be the reference plane of the multi-frame model and let $\pi_n$ be the reference plane of the single frame model.
(b) For each point along the vehicle path (x, y), compute the corresponding (X, Y, Z) point on the plane $\pi_m$. Then compute the distance from the point (X, Y, Z) to the plane $\pi_n$.
(c) The distance from the point (X, Y, Z) to the plane $\pi_n$ is added to the road profile for that point along the path.
4. Compute the homography matrix ($H_{nm}$) of the road between frames n and n−m (if m=k we can reuse the results).
5. Use the inverse of $H_{nm}$ to transform the path coordinates (x1, y1) from frame n−m to frame n, which gives the path from frame n−m in the coordinates of frame n, ($x1_h, y1_h$).
p1=[x1,y1,ones(size(y1))];
p2=p1*inv(Hnm)';
p2=[p2(:,1)./p2(:,3),p2(:,2)./p2(:,3),p2(:,3)./p2(:,3)];
x1h=p2(:,1);
y1h=p2(:,2);
6. Interpolate the values of the multi-frame road profile ($ProfL_1$) and confidence values ($VS_1$) to the coordinates of the path of frame n, (x2, y2):
ProfL__1Interp=interp1(y1h,ProfL__1,y2,'linear','extrap') ';
VS__1Interp=interp1(y1h,VS__1,y2,'linear','extrap')';
In the above code it is assumed that only small lateral changes in the path. If large lateral changes are expected then it is possible to reduce the multi-frame confidence at point (i) by a function of the difference (x1h(i)−x2(i)).
7. The new multi-frame profile is a weighted average between the warped multi-frame profile and the current single frame profile:
ProfL__1=(a*VS.*ProfL+(1−a)*VS__1Interp.*ProfL__1Interp)./(a*VS+(1−a)*VS__1Interp);
Weighting is based on the confidence scores and a time factor (a). Note that this Matlab code. ProfL__1, VS, ProfL, VS__1Interp and ProfL__1Interp are all vectors and that the weighted average is performed for each element along the vector ProfL__1.
8. The multi-frame confidence is also computed:
VS__1=max(1,(a*VS+(1−a)*VS__1Interp));
Note that the single frame confidence value (VS) as defined is a vector of numbers between zero and 11 (assuming a path of width 0.5 m sampled every 0.05 m). The max function ensures that the multi-frame confidence is non zero for every point in the vector.

Issues for Real-Time Implementation

Initial Grid Tracking

Figure 16:
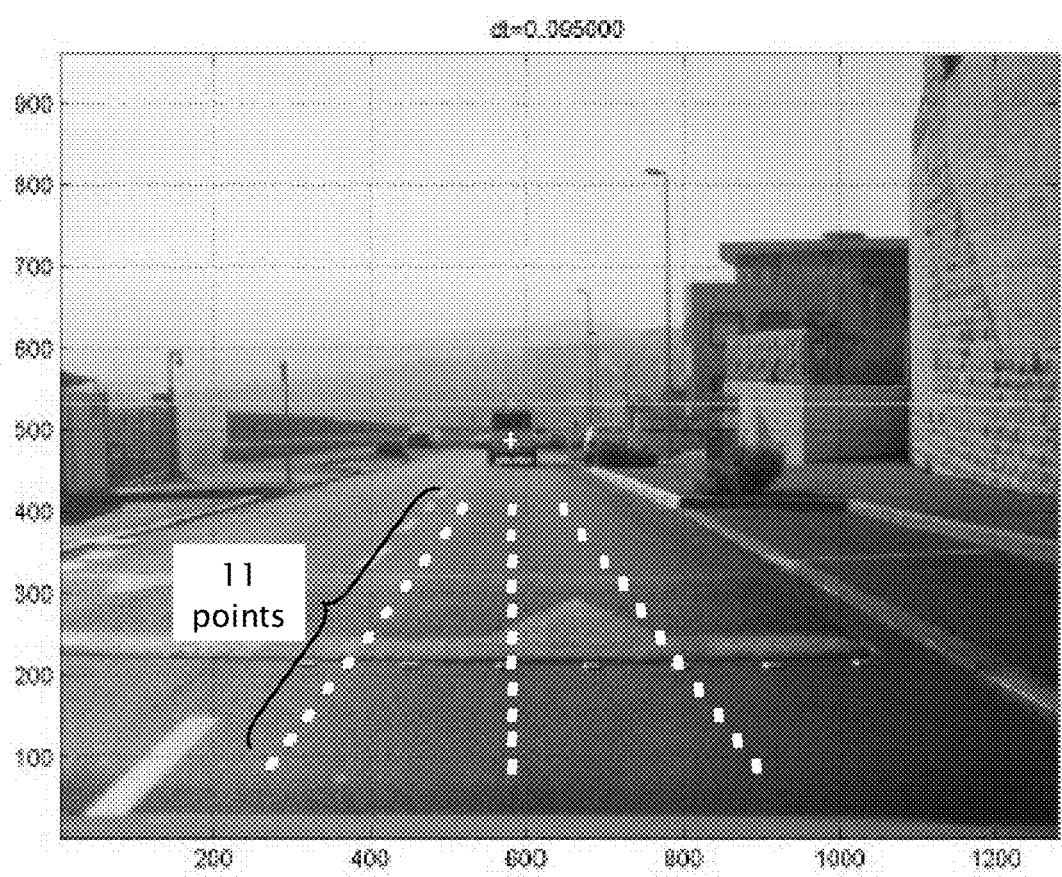
FIG. 16 shows an example of the 33 points used to find the road plane homography, according to a feature of the present invention.

With reference to FIG. 16, the initial grid of points may be reduced to 33 points arranged in three lines of 11 points each. These lines correspond to three lines on the road, in the direction of the road laterally spaced −1 m, 0 m and 1 m from the center of the vehicle (shown by white cross). The 33 points are equally spaced in the image y direction from a line corresponding to 6 m in front of vehicle 18 to 30 m in front of vehicle 18.

The vanishing point of the 3 lines might be defined by the initial calibration (x0, y0) or it might be modified using the pitch and yaw estimates. For example, a given yaw rate and forward speed can be used to compute the inter-frame forward motion dZ and rotation dTheta. The latter angle can be translated into pixels:
dZ=dt*speed;
dTheta=dt*yawRate;
dThetaPix=f*dTheta*pi/180;
One can then estimate the epipole using the Ackermann model:
epxEst=−dThetaPix*(0.5+camToRearAxle/dZ);
By adjusting the vanishing point in this way, the points can be better situated on the road surface on curves.

Selecting Inter-frame Distances

It is convenient to process images at a fixed rate and to compute the homography between consecutive processed frames. For example, suppose the camera frame rate is 30 frames per second (FPS) but the control algorithm requires out only at 15 FPS. In that case every second frame can be processed. The homography is computed between frame n and frame n−2. The homography can be decomposed to provide the rotation and translation motion between the times the two images were captured. The homography can also be used to transfer results from one time step to the next.

The accuracy of the surface shape is increased with larger motions. However, if vehicle 18 is moving slowly the inter-frame motion described above might be too small to provide useful height profile information. Therefore a second image pair is picked where one is the current image and the second image is taken at least a certain minimum distance before. A second homography is computed and then the second homography is used to define the reference ground plane.

In some cases vehicle 18 speed and desired minimum distance traveled are such that inter-frame spacing might oscillate between two values. For example between 4 and 6 frames, the desired minimum distance traveled can be adjusted so that it consistently results in one or the other spacing.

Chaining Homographies

The second homography can be computed in the same way. However, instead of using an initial guess based on the estimated motion, the homographies recovered from the close image pairs can be chained to get a very good initial guess. The "close" as used herein refers to a pair of images refers to image frames captured close in time to each other. The term "chaining" as used herein when referring to homographies is performed by matrix multiplying the homography matrices. For example, image frames captured consecutively at times a,b,c. Chaining homographies between "close" pairs of image frames then means matrix multiplying $H_{ab}$ which is the homography between images captured at time a and time b with $H_{bc}$ which is the homography between images captured at time b and time c.

When traveling at high speeds (or when the processing frame rate is slow) the inter-frame travel distance for the close pair is already large enough to provide good 3D structure. Thus it would appear that a second round of tracking points is not required. However, it has been found that a second round is useful using the homography result from the first round as an initial guess. The second round helps in the cases of very large inter-frame motion (high speed travel) and large pitch and yaw values.

No Tracking Verification

Since the RANSAC approach is very robust to outliers, bad tracking results are rejected. Thus, there is no need for forward/backward verification or to estimate the quality of the tracking of each point and these steps can be removed to speedup the computation. The number of inliers can be used to verify overall if the tracking was successful. For example, a threshold of at least 20 inliers can be used.

Given that 50% inliers can be expected, iteratively re-weighted least squares (IRLS) can be used instead of RANSAC. IRLS is typically faster.

Effects of Rolling Shutter

With rolling shutter cameras, different image rows are in effect captured at different times. Different image rows captured at different times has negligible effect on the tracking results. The tracked points match a homography very well even when driving at fast speeds. For more accurate structure and motion recovery it is possible to correct for the effects of the rolling shutter on the tracked points.

Consider a point p1=x1; y1 that was tracked to p2=x2; y2. Assuming that the rolling shutter is from top to bottom, p2 was in fact captured $dt_L=(y2-y1)*T_L$ seconds after p1. Thus the actual motion must be corrected by a factor:

$$\frac{dt}{dt+dt_L} \quad (10)$$

Computing the Contour as One Dimensional Search

Computing the Path

After the reference plane has been determined in step 303, vehicle 18 wheel path in the image can be computed in multiple ways:

1. Based on the yaw rate or steering angle and speed, the path can be computed in 3D world coordinates and then mapped to the reference plane.
2. A 3D path can also be computed for an arbitrary motion. For example as part of a path planning exercise. The path does not have to correspond to vehicles 18 actual motion.
3. The path in the image can also be derived from the homography matrix without having to compute it in 3D world coordinates:
   Determine the image location of a point on the road 5 m in front of vehicle 18.
   Use the 'close' homography matrix to map that point to the next time step.
   Repeat till the desired distance has been achieved.

Thus, if we assume that the first homography which transforms from frame n−1 to frame n is a good predictor of the second homography which transforms from frame n to frame n+1, then we locate a point p in frame n which is on the vehicle path (for instance 5 meters in front of the vehicle) and use the first homography to determine which point $p_2$ in frame n will be at the same relative position in frame n+1 as point p in frame n. Point $p_2$ is also on our path but a bit further away. We can the do this recursively and see which point in frame n will map to point p2 in frame n+1 and so on.

Warping

In image 2, a strip 15 pixels wide is determined around the desired wheel path. This strip is 'straightened' to sub pixel accuracy by shifting each row so that the center of the path aligns. The corresponding strip from image 1 (as shown in FIG. 16) is computed by combining the alignment function which was applied to image 2 with the homography warp between image 1 and image 2.

For points on the reference plane this will bring perfect alignment. For points away from the reference plane the residual motion will be vertical to a very good approximation. In particular, if the wheel path correctly follows the vehicle motion this alignment and warp brings the two strips to a very good approximation.

The width of the strip can be increased as the computational resources allow. It has been found that a strip of 31 pixels wide gives lower noise.

Filtering

A low pass filter is applied in the horizontal direction and a band-pass filter (implemented as a difference of Gaussians (DoG)) applied in the vertical direction.

Normalized Correction

1. Strip 1 is shifted vertically relative to strip 2 in integer values: [−4:1:4] for a total of 9 shifts.
2. The pixels in shifted strip are multiplied pixel to corresponding pixel in strip 2 and then summed horizontally. The results is 9 vectors.
3. The vectors are smoothed vertically by a box car filter of width 9 applied once or twice.
4. Each vector is used to compute the normalized correlation (nrm):
   Let N be the norm of the smoothing filters.

$$nrm = \frac{\sum I_{12} - (\sum I_1 * \sum I_2/N)}{\sqrt{((\sum I_{11} - \sum I_1^2/N)(\sum I_{22} - \sum I_2^2/N))}} \quad (11)$$

5. The peak in the normalized correlation score is determined first to the nearest integer and then to sub-pixel using a parabolic interpolation on the 3 or 5 shift values closest to the peak.
6. The height of the peak value and the sharpness of the peak are used to determine a confidence value for that point.

Hazard Detection

Figure 17A:
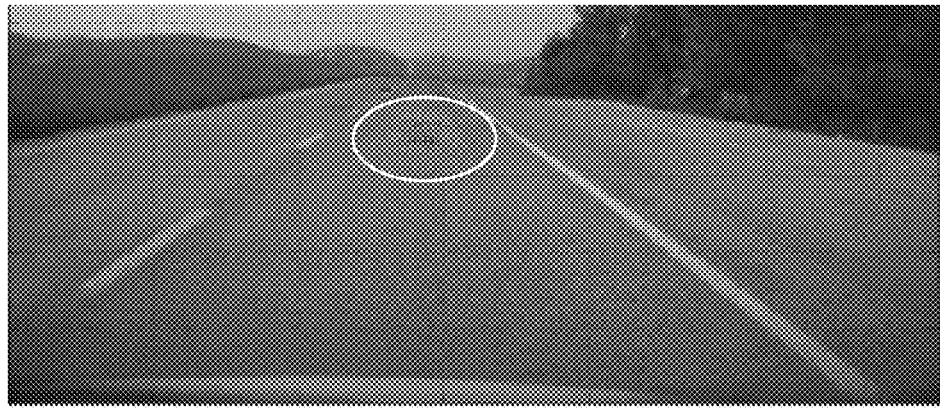
FIGS. 17a and 17b shows an example of hazard detection using a grid of points, according to a feature of the present invention.
Figure 17B:
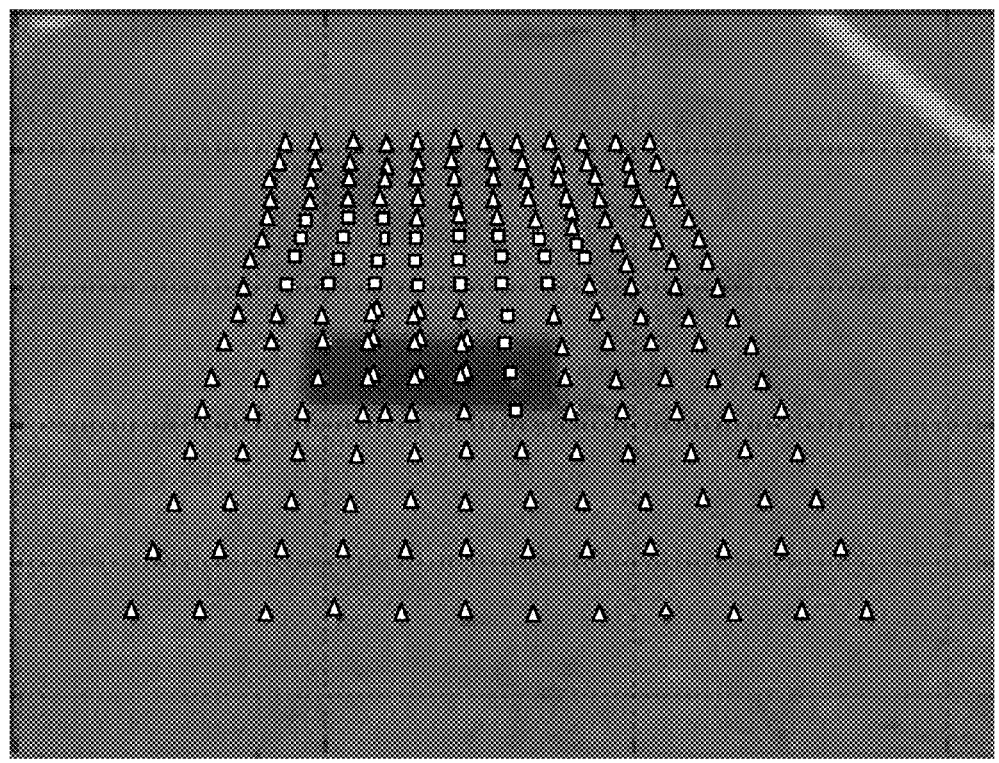

Reference is now made to FIGS. 17*a* and 17*b* which show hazard detection using a grid of points, according to a feature of the present invention. The same technology can be used for detection debris or other hazards on the road. In particular in can be used to detect objects of 10 cm or higher and a width of 20 cm or more. FIG. 10d shows how a sidewalk can be detected by applying a threshold on the residual flow. Hazards can be detected efficiently at distances of 30 m and beyond. It can work reasonably well "out of the box" but certain tuning can improve performance.

1. The grid of 33 points for determining the reference plane can be placed further ahead so that it maps to a region between 10 m and 40 m.
2. For highway driving the width of the grid can be extended to +/−1.5 meters.
3. The distance between far images can be extended to 3 meters or more.
4. A grid of test points can be placed to cover an area 15 meters to 30 meters ahead and the width of the lane of the host vehicle. (See FIGS. 17a and 17b). These points can be tracked along the epipolar line or in 2D image space as performed in the initial image input and initial warping. This is similar to what was shown in FIG. 10d but the grid of points is tuned to the particular application.
5. Instead of using a fixed threshold of 0.5pixels for the whole grid a lower threshold can be used for the further away points. More formally, the threshold can be defined in metric height above the plane rather than residual motion.

Instead of using a grid of discrete points an area based method can be used. This is similar to steps 601 and 602 for a one dimensional search but extended to an area. By way of example this will be demonstrated for a look ahead region extending from 20 m to 40 m ahead and 2 m wide laterally centered around the vehicle 18 path at 30 m:

1. From step 303 we have determined the homography between the two far images.
2. This homography can be decomposed into rotation, translation and the plane normal.
3. Using the plane normal we can determine camera 12 pitch and roll of image 2 relative to the road plane. In effect this means determining the horizon line.
4. Together with the known camera 12 height and focal length we can determine the lines in the image which corresponds to 30 m and 40 m ahead.
5. We pick two points along the line at 30 m, 1 m meter to either side of the predicted vehicle path. Let these be p1=(x1; y1) and p2=(x2; y2).
6. From the translation we can determine the epipole.
7. We pick two points along the line at 40 m which are the intersections of the line at 40 m and the lines joining p1 and the epipole and p2 and the epipole.
8. We determine a homography that maps points p1 and p2 to x1; y30 and x2; y30 respectively, where y30 is the y coordinate along the 30 m line on the vehicle path (the exact value of y30 is not critical). The homography is further defined to map the two points on the 40 m line to x1; y40 and x2; y40 respectively.
9. The homography will produce a top view image with lines passing through the epipole in the original image mapped to vertical lines.
10. We use the homography to warp a region of image 2 between 20 meters and 40 meters and with 2 meters width (with possibly some margins). This homography can also be chained with the homography between image 1 and image 2 to map image 1 to a corresponding image.
11. In the end result, for points on the reference plane there will be no motion between the two warped images. For points above or below the reference plane the motion will be in the vertical direction.
12. Dense normalized correlation can be computed between the two images for various shifts (e.g. [−4:1:4]) in they direction and sub-pixel flow can be computed around the maximum. 13. Thresholding this flow map can give hazards on the road.

Although embodiments of the present invention are presented in the context of driver assistance applications, embodiments of the present invention may be equally applicable in other real time signal processing applications and/or digital processing applications, such as communications, machine vision, audio and/or speech processing as examples.

The indefinite articles "a", "an" is used herein, such as "an image" has the meaning of "one or more" that is "one or more images".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A computerized method for detecting a vertical deviation in contour of a road, the method performable by a driver assistance system mountable in a host vehicle while the host vehicle is moving, wherein the driver assistance system includes a camera operatively connectable to a processor, the method comprising:

capturing from the camera a first image of the road at a first time, a second image of the road at a second time later than the first time, and a third image of the road at a third time later than the second time;

by matching image points of the road in the first image and corresponding image points of the road in the second image, computing a first homography which transforms the first image of the road to the second image of the road;

by matching image points of the road in the second image and corresponding image points of the road in the third image, computing a second homography which transforms the second image of the road to the third image of the road;

chaining the first and second homography to compute a chained homography; and by using the chained homography as an initial guess, computing a third homography which transforms the first image of the road to the third image of the road.

2. The method of claim 1, wherein the first and second homographies are represented by respective matrices and wherein said chaining to compute a chained homography is performed by multiplying the matrices.

3. The method of claim 1, wherein the third homography is computed from matching image points of the road in the first image and corresponding image points of the road in the third image.

4. The method of claim 1, further comprising:
estimating the vehicle path in the images from at least one of the homographies.

5. The method of claim 1, further comprising:
processing image motion between the first image, the second image and the third image of the road, wherein said processing said image motion between said images of the road includes computing the vertical deviation in the contour of the road using a road surface model of the road.

6. The method of claim 5, wherein said computing the vertical deviation in the contour from said road surface model includes estimating optical flow between the first, second and third images by comparing said optical flow with an optical flow as predicted by said road surface model and producing thereby a residual optical flow indicating the vertical deviation.

7. The method of claim 5, wherein said processing motion of said images of the road includes:
   initial warping said second image toward said first image assuming a planar model for the contour of the road, thereby producing a warped second image frame.

8. The method of claim 7, wherein said initial warping includes:
   aligning said second image with said first image by adjusting for at least one image shift due to at least one motion of the vehicle relative to the road, wherein said at least one motion is selected from the group consisting of: yaw, pitch and roll; and
   adjusting for relative scale change between said second image frame and said first image frame, wherein said relative scale change arises from different distances to the camera.

9. The method of claim 7, further comprising:
   selecting a plurality of selected image points in said first image;
   for said selected image points, locating a plurality of image patches disposed respectively about said selected image points; and
   tracking the selected image points by correlating said image patches in said first image frame with corresponding image patches in said warped second image frame, thereby producing a plurality of tracked points.

10. A driver assistance system mountable in a host vehicle, wherein the driver assistance system includes a camera operatively connectable to a processor, wherein the driver assistance system is operable while the host vehicle is moving to detect a vertical deviation in contour of a road, wherein a first image is captured at a first time, a second image is captured at a second time later than the first time and a third image is captured at a third time later than the second time,
   wherein image points of the road in the first image are matched to corresponding image points of the road in the second image to compute a first homography which transforms the first image of the road to the second image of the road,
   wherein image points of the road in the second image are matched to corresponding image points of the road in the third image to compute a second homography which transforms the second image of the road to the third image of the road, and
   wherein a chained homography is computed by chaining the first homography with the second homography and by using by using the chained homography as an initial guess, a third homography is computed which transforms the first image of the road to the third image of the road.

11. The driver assistance system of claim 10, wherein the first and second homographies are represented by respective matrices and wherein the chained homography is computed by multiplying the matrices.

12. The driver assistance system of claim 10, wherein the second homography is computed from matching image points of the road in the second image and corresponding image points of the road in the third image.

13. The driver assistance system of claim 10, further operable to:
   estimating the vehicle path in the images from at least one of the homographies.

14. The driver assistance system of claim 10, wherein image motion is processed between respective the first, second and third images of the road, wherein the vertical contour of the road is estimated using a road surface model of the road and the vertical deviation in the contour is computed from said road surface model.

15. The driver assistance system of claim 10, wherein optical flow is estimated between a plurality of first image patches of the road derived from said first image and corresponding second image patches of the road derived from said second image.

16. The driver assistance system of claim 15, wherein the vertical deviation in the contour is determined by comparing said optical flow with an optical flow as predicted by said road surface model to produce thereby a residual optical flow indicating the vertical deviation.

17. A computerized method for detecting a vertical deviation in contour of a road, the method performable by a driver assistance system mountable in a host vehicle while the host vehicle is moving, wherein the driver assistance system includes a camera operatively connectable to a processor, the method comprising:
   capturing from the camera a first image of the road at a first time and a second image of the road at a second time;
   by matching image points of the road in the first image and corresponding image points of the road in the second image, computing a homography which transforms the first image of the road to the second image of the road;
   use the homography to align and warp the first image toward the second image to produce thereby a warped first image;
   compute the optical flow between the second image to the warped first image;
   comparing the optical flow with a road surface optical flow based on a road surface model to produce thereby a residual optical flow different from the road surface optical flow.

18. The computerized method of claim 17, further comprising:
   using the residual optical flow to generate a vertical deviation in contour of the road; and
   using the vertical deviation as an input to a suspension control system of the vehicle.

19. The computerized method of claim 17, further comprising:
   using the residual optical flow to generate a vertical deviation in contour of the road to detect a hazard of height above the road of ten centimeters at a distance of more than thirty meters.

* * * * *